United States Patent
Lim et al.

(10) Patent No.: US 9,628,543 B2
(45) Date of Patent: Apr. 18, 2017

(54) INITIALLY ESTABLISHING AND PERIODICALLY PREFETCHING DIGITAL CONTENT

(71) Applicant: Samsung Electronics Company, Ltd., Suwon-si, Gyeonggi-do (KR)

(72) Inventors: Patrick H. Lim, Cupertino, CA (US); Harvey Tang, Sunnyvale, CA (US); King-Sun Wai, Castro Valley, CA (US); Alissa W. Bell, Redwood City, CA (US); Adnan M. Agboatwalla, Saratoga, CA (US); Daren Teh Chuan Tsui, San Carlos, CA (US); Willy Lai, Palo Alto, CA (US); Jeffrey Lui, San Ramon, CA (US); Kelly McMichael, San Mateo, CA (US); Samir Safi, Fremont, CA (US); Yen Ma, San Francisco, CA (US); Olchi Skant, San Jose, CA (US); Neil Everette, San Jose, CA (US); Cheryl Sedota, Mount Pleasant, SC (US); Maverick Valesco, San Jose, CA (US); Rachel Kobetz, San Jose, CA (US); Edwin Ho, Palo Alto, CA (US); Shawn Hwang, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 14/181,570

(22) Filed: Feb. 14, 2014

(65) Prior Publication Data

US 2015/0095777 A1   Apr. 2, 2015

Related U.S. Application Data

(60) Provisional application No. 61/883,845, filed on Sep. 27, 2013, provisional application No. 61/896,470, (Continued)

(51) Int. Cl.
*G06F 17/00* (2006.01)
*H04L 29/08* (2006.01)
(Continued)

(52) U.S. Cl.
CPC .......... *H04L 67/02* (2013.01); *G06F 3/04847* (2013.01); *G06F 3/04883* (2013.01);
(Continued)

(58) Field of Classification Search
CPC .............. H04H 20/28; H04N 21/4622; H04N 21/4821; H04N 21/6181; H04L 65/4084; H04L 65/60; H04L 67/145; H04L 67/2847
See application file for complete search history.

(56) References Cited

U.S. PATENT DOCUMENTS 5,892,535 A    4/1999   Allen et al.
6,502,194 B1 *  12/2002  Berman ............. G06Q 30/0601
                                                            370/231
(Continued)

FOREIGN PATENT DOCUMENTS

DE   402011006380-0003   3/2012
DE   402011006380-0007   3/2012
(Continued)

OTHER PUBLICATIONS

Burigat, S. et al., "Visualizing references to off-screen content on mobile devices: A Comparison of Arrows, Wedge, and Overview + Detail", Interacting with Computers, Feb. 26, 2011, pp. 156-166, Elsevier, Netherlands.
(Continued)

*Primary Examiner* — Andrew C Flanders
(74) *Attorney, Agent, or Firm* — Sherman IP LLP; Kenneth L. Sherman; Steven Laut

(57) ABSTRACT

Content playback that includes maintaining a connection between an electronic device and a content source. Content
(Continued)

is prefetched prior to attempting to play one or more stations on the electronic device. Scanning a multiple stations and listening to a particular one station is distinguishable.

27 Claims, 15 Drawing Sheets

Related U.S. Application Data filed on Oct. 28, 2013, provisional application No. 61/928,959, filed on Jan. 17, 2014.

(51) Int. Cl.
    *G06F 3/0484* (2013.01)
    *G06F 3/0488* (2013.01)

(52) U.S. Cl.
    CPC .......... *H04L 67/142* (2013.01); *H04L 67/145* (2013.01); *H04L 67/2847* (2013.01)

(56) References Cited

U.S. PATENT DOCUMENTS

| | | | |
|---|---|---|---|
| 7,076,202 B1* | 7/2006 | Billmaier | H04N 5/44543 348/E5.105 |
| 7,312,785 B2 | 12/2007 | Tsuk et al. | |
| 7,683,918 B2 | 3/2010 | Bohan et al. | |
| 7,779,148 B2 | 8/2010 | Arimilli et al. | |
| 7,812,826 B2 | 10/2010 | Ording et al. | |
| D631,060 S | 1/2011 | Flik et al. | |
| 7,941,765 B2 | 5/2011 | Fleck et al. | |
| 7,956,272 B2 | 6/2011 | Wysocki et al. | |
| 8,018,434 B2 | 9/2011 | Gomez et al. | |
| 8,028,081 B2 | 9/2011 | Kandelkar et al. | |
| 8,165,546 B2 | 4/2012 | Ingrassia et al. | |
| 8,239,784 B2 | 8/2012 | Hotelling et al. | |
| 8,245,156 B2 | 8/2012 | Mouilleseaux et al. | |
| 8,307,306 B2 | 11/2012 | Komatsu et al. | |
| 8,402,390 B2 | 3/2013 | Brodersen et al. | |
| 8,429,521 B2 | 4/2013 | Lloyd et al. | |
| 8,458,125 B1 | 6/2013 | Chong, Jr. et al. | |
| D687,046 S | 7/2013 | Plitkins et al. | |
| D690,734 S | 10/2013 | Tseng | |
| D698,363 S | 1/2014 | Asai | |
| 8,634,944 B2 | 1/2014 | Bull et al. | |
| 8,677,257 B2 | 3/2014 | Doepke et al. | |
| D716,325 S | 10/2014 | Brudnicki | |
| D727,928 S | 4/2015 | Allison | |
| D741,898 S | 10/2015 | Soegiono | |
| D744,535 S | 12/2015 | Shin | |
| D745,046 S | 12/2015 | Shin | |
| D749,634 S | 2/2016 | Cho | |
| D750,646 S | 3/2016 | Tawa | |
| D752,072 S | 3/2016 | Song | |
| D753,131 S | 4/2016 | Cuthbert | |
| 2001/0030660 A1 | 10/2001 | Zainoulline | |
| 2005/0044509 A1 | 2/2005 | Hunleth et al. | |
| 2005/0050209 A1 | 3/2005 | Main, II | |
| 2006/0050701 A1 | 3/2006 | Peterka et al. | |
| 2007/0088681 A1 | 4/2007 | Aravamudan et al. | |
| 2009/0031366 A1* | 1/2009 | Carhart | H04H 20/103 725/86 |
| 2009/0292819 A1* | 11/2009 | Kandekar | H04N 7/17318 709/231 |
| 2010/0058240 A1 | 3/2010 | Bull et al. | |
| 2010/0156818 A1 | 6/2010 | Burrough et al. | |
| 2010/0281107 A1 | 11/2010 | Fallows, Jr. et al. | |
| 2011/0161409 A1* | 6/2011 | Nair | G06F 8/38 709/203 |
| 2011/0251987 A1* | 10/2011 | Buchheit | H04N 21/4331 706/46 |
| 2012/0066403 A1* | 3/2012 | Evans | H04H 20/106 709/231 |
| 2012/0257560 A1 | 10/2012 | Srinivasan et al. | |
| 2013/0218942 A1 | 8/2013 | Willis et al. | |
| 2015/0040069 A1 | 2/2015 | Gunaratnam | |
| 2015/0294627 A1 | 10/2015 | Yoo | |
| 2016/0098154 A1 | 4/2016 | Ko | |

FOREIGN PATENT DOCUMENTS

| | | |
|---|---|---|
| DE | 402011006380-0010 | 3/2012 |
| EM | 001049415-0001 | 1/2008 |
| EM | 001049415-0002 | 1/2008 |
| EM | 001049415-0003 | 1/2008 |
| EM | 001049415-0004 | 1/2008 |
| EM | 001049415-0005 | 1/2008 |
| EM | 001049415-0006 | 1/2008 |
| EM | 001049415-0007 | 1/2008 |
| EM | 001049415-0008 | 1/2008 |
| EM | 001049415-0009 | 1/2008 |
| EM | 000947742-0006 | 3/2008 |
| EM | 001099550-0002 | 4/2009 |
| EM | 001099550-0018 | 4/2009 |
| EM | 001099550-0034 | 4/2009 |
| EM | 001099550-0035 | 4/2009 |
| EM | 001507526-0001 | 5/2009 |
| EM | 001507526-0002 | 5/2009 |
| EM | 001576562-0015 | 7/2009 |
| EM | 001924010-0001 | 9/2011 |
| EM | 001325864-0023 | 4/2012 |
| EM | 001328124-0041 | 5/2012 |
| EM | 002075002-0001 | 7/2012 |
| EM | 002075002-0006 | 7/2012 |
| EM | 002108027-0008 | 9/2012 |
| EM | 002108027-0009 | 9/2012 |
| EM | 002108027-0013 | 9/2012 |
| EM | 002108027-0014 | 9/2012 |
| EM | 002108027-0017 | 9/2012 |
| EM | 001364293-0001 | 3/2013 |
| JP | 1459082 S | 1/2013 |
| JP | 1469758 S | 5/2013 |
| KR | 30-0583142 | 12/2010 |
| KR | 30-0589618 | 2/2011 |
| KR | 30-0624229 | 12/2011 |
| KR | 30-0631975 | 3/2012 |
| KR | 30-0634808 | 3/2012 |
| KR | 30-0668660 | 11/2012 |
| KR | 30-0681549 | 2/2013 |
| KR | 30-0701584 | 7/2013 |
| WO | 2009/095080 A1 | 8/2009 |
| WO | 2012118626 A1 | 9/2012 |
| WO | 2013052056 A1 | 4/2013 |
| WO | 2013103988 A1 | 7/2013 |

OTHER PUBLICATIONS

Collazo, M., "New OPRA Binary Output Formats: Revision, National Mark Systems Common IP Multicast Distribution Network", Aug. 20, 2012, Securities Industry Automation Corporation (SIAC), pp. 1-45, Revision 1.38, United States.

Fisher, N., "Building the Next SoundCloud", Backstage Blog, Jun. 14, 2012, pp. 1-20, United States.

Kingyo Design, "Kingyo GUI Design", Jun. 7, 2010, pp. 1-13, Korea [downloaded from http://www.ikingyo.com/workDetail.asp?id=388 on Jul. 6, 2015].

Rigo, "Lenovo Touch-Dream—Rigo Design", Dec. 2008, pp. 1-10, Korea, [downloaded from http://www.rigodesign.com/work/design/php?id=21 on Jul. 6, 2015].

Tivoli Audio LLC, "Tivoli Radio", Jul. 17, 2012, pp. 1-2, United States [downloaded from http://www.tivoliaudio.com/tivoliradioapp on Jun. 9, 2015].

Communication dated Feb. 12, 2015 issued by the European Patent Office in counterpart European Patent Application No. 14185178.2.

"Fullpower Technologies, Inc.," "2011 About.com Readers' Choice Awards Name MotionX-GPS Best Outdoor/Hiking App, Mar. 21, 2011, pp. 1-2, News.Motionx.com [downloaded http://news.motionx.com/motionx/2011 /03/21/2011 -aboutcom-readers-choice-awards-name-motionx-gps-best-outdoorhiking-app/> on Apr. 11, 2016]".

(56) References Cited

OTHER PUBLICATIONS

Littke, J., "CSS: Animated progress circle freebie", Dribble.com, Apr. 2, 2013, pp. 1-4, United States [downloaded from https://dribbble.com/shots/1010978-CSS-Animated-progress-circle-freebie on Jul. 20, 2016].

The Mana World, "Archive: Magic system GUI notes", themanaworld.org, Jul. 1, 2013, pp. 1-3, [downloaded from https://www.themanaworld.org/index.php/Archive:Magic_system_GUI_notes on Apr. 11, 2016].

Microsoft, "Spin Wheel User Control", code.msdn.microsoft.com, Aug. 9, 2013, pp. 1-4, [downloaded from https://code.msdn.microsoft.com/windowsapps/Spin-Wheei-User-Control-fe32ac81 on Apr. 11, 2016].

Sande, J-T., "Twitter Icon", dribbble.com, Oct. 14, 2012, pp. 1-6, [downloaded from https://dribbble.com/shots/769380-Twitter-Icon on Jul. 20, 2016].

Rocchi, C., "How to Create a Rotating Wheel Control with UIKit", raywenderlich.com, Feb. 22, 2012, pp. 1-2, [downloaded from https://www.raywenderlich.com/9864/how-to-create-a-rotating-wheel-control-with-uikit on Apr. 11, 2016].

U.S. Non-Final Office Action for U.S. Appl. No. 29/482,2015 mailed Apr. 21, 2016.

\* cited by examiner

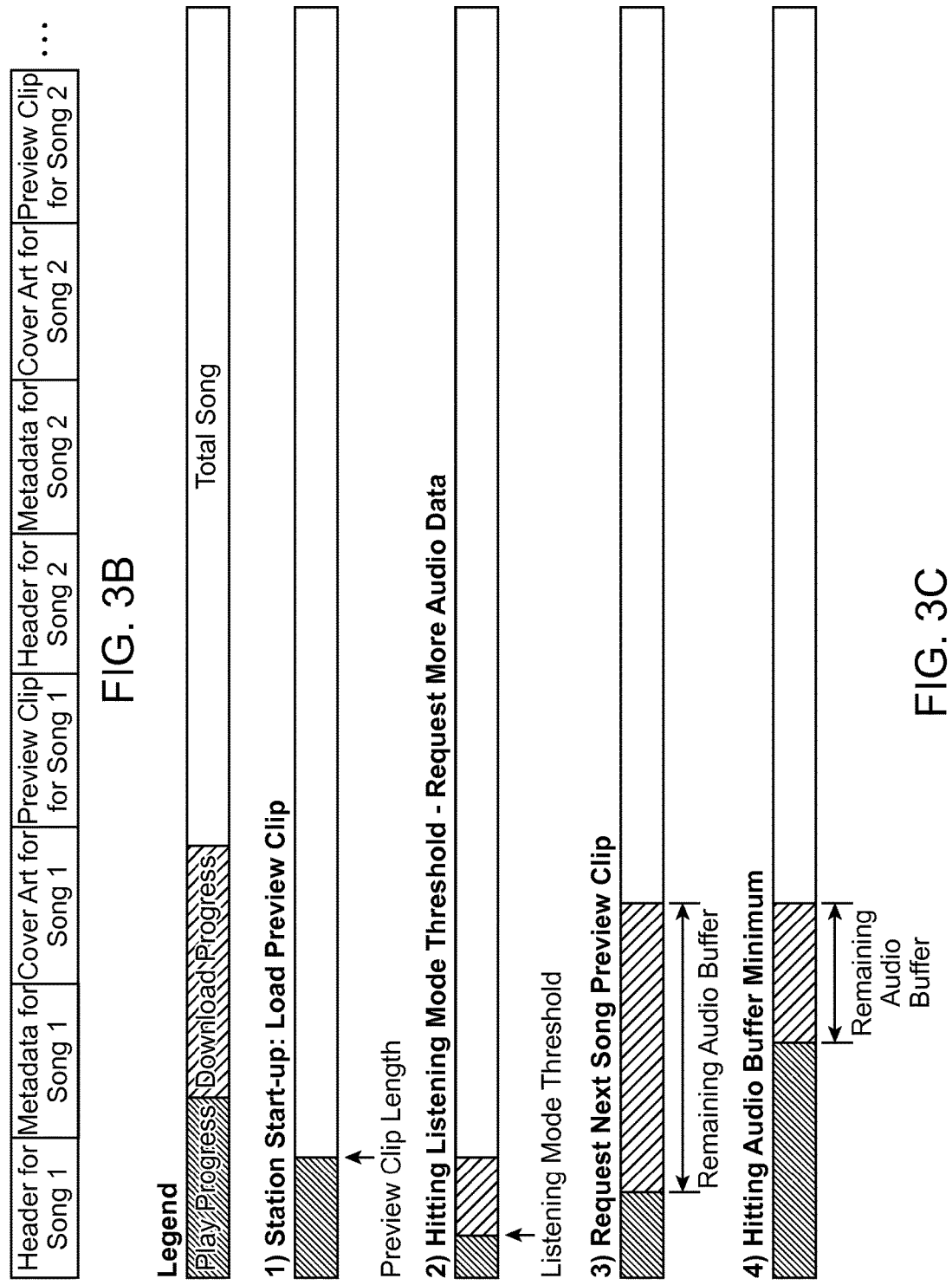

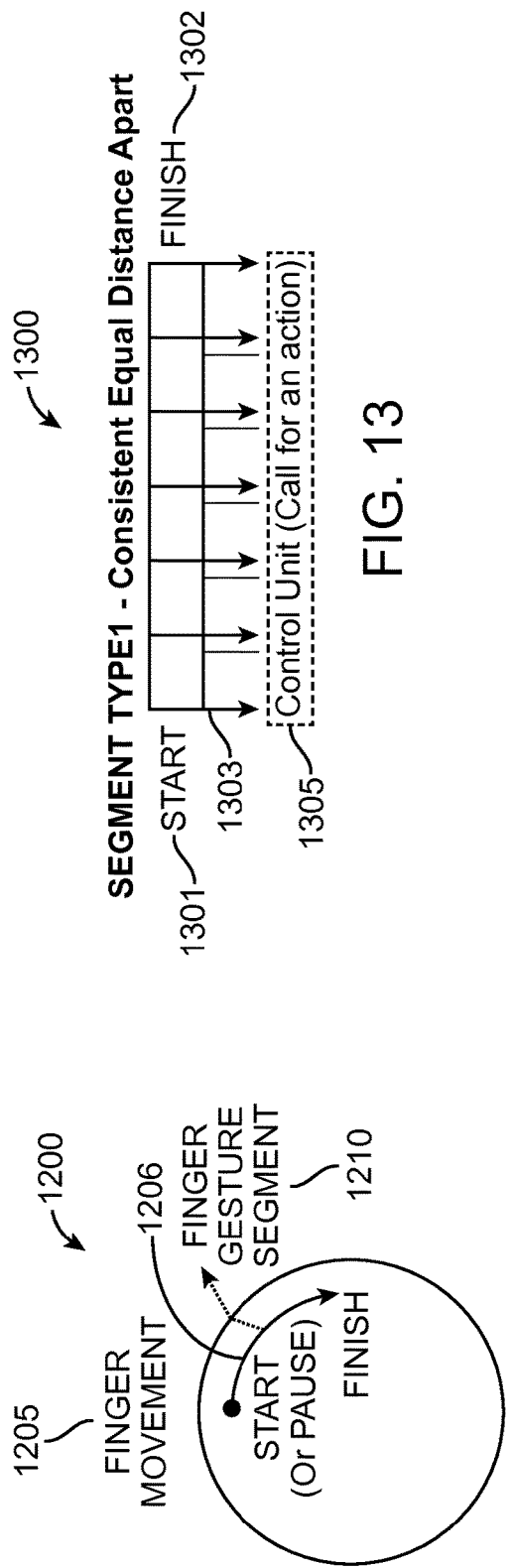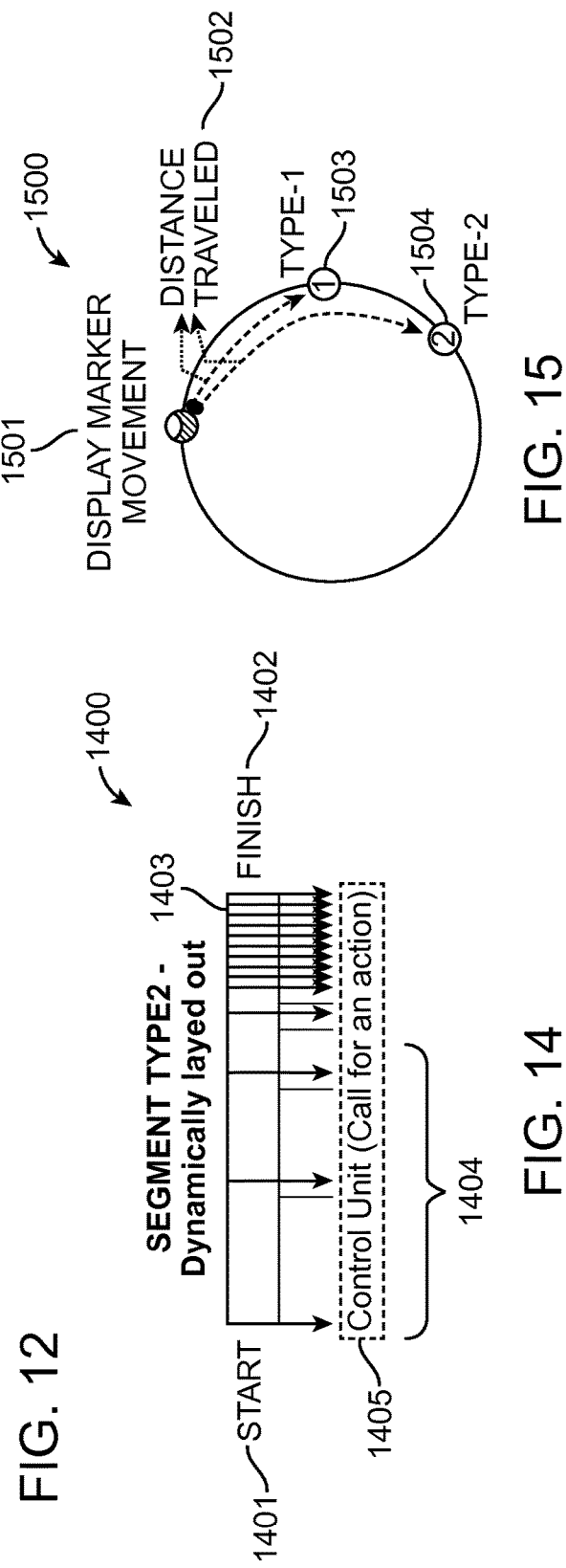

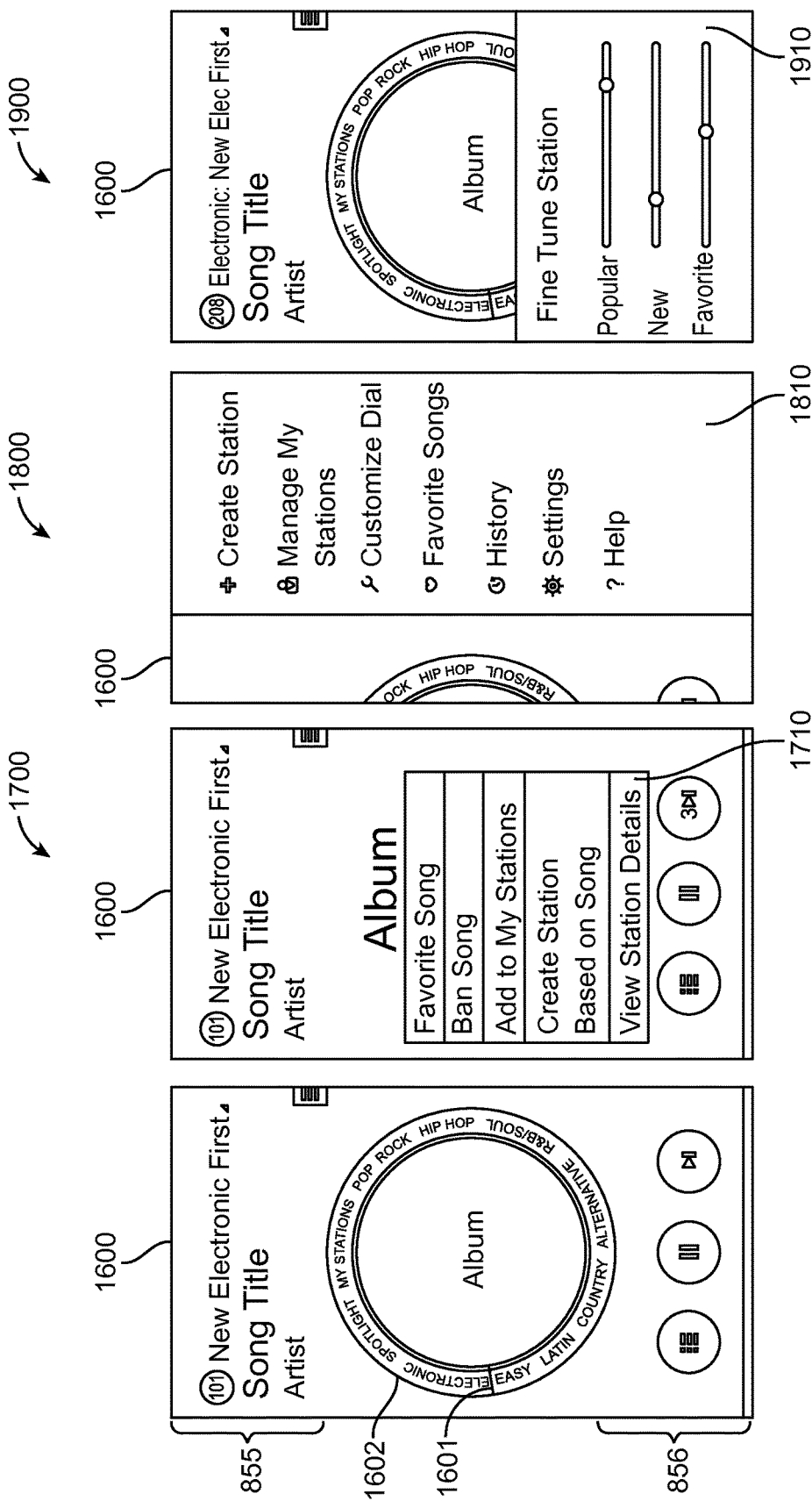

INITIALLY ESTABLISHING AND PERIODICALLY PREFETCHING DIGITAL CONTENT

CROSS-REFERENCE TO RELATED APPLICATIONS

This application claims the priority benefit of U.S. Provisional Patent Application Ser. No. 61/883,845, filed Sep. 27, 2013, and U.S. Provisional Patent Application Ser. No. 61/896,470, filed Oct. 28, 2013 and U.S. Provisional Patent Application Ser. No. 61/928,959, filed Jan. 17, 2014, all of which are incorporated herein by reference in their entirety.

TECHNICAL FIELD

One or more embodiments generally relate to smooth operation and content playback for portable communication devices and, in particular, to maintaining a connection for a mobile electronic device and initially establishing and periodically pre-fetching content for playback and providing a navigational dial user interface for playback selection.

BACKGROUND

Mobile electronic devices are capable of playing back stored content and using playlists to select content to play in a particular user determined order or from shuffling content from a complete list of content or a playlist. Radio style content using mobile devices, such as smart phones, is played by selecting a station and waiting for a song selection to start. Changing stations is conventionally made by selecting from a screen display based on a visual display with a genre title. When switching between radio stations using a mobile device, a delay exists between starting up content to play.

SUMMARY

One or more embodiments generally relate to maintaining an open connection and prefetching content for content playing for electronic devices. In one embodiment, a method provides for content playback. In one embodiment, the method includes maintaining a connection between an electronic device and a content source. In one embodiment, content is prefetched prior to attempting to play one or more stations on the electronic device. In one embodiment, scanning a multiple stations and listening to a particular one station is distinguishable.

In one embodiment, a client for content playback comprises a command channel module that provides an interface to a content server and maintains a connection between the client and the content server. In one embodiment, a prefetch manager module prefetches content prior to a radio service module attempting to play one or more stations by the client. In one embodiment, the radio service module provides for distinguishing between playback of scanning a plurality of stations for preview content clips and playing content for a particular one station.

In one embodiment a non-transitory computer-readable medium having instructions which when executed on a computer perform a method comprising: maintaining a connection between an electronic device and a content source. In one embodiment, content is prefetched prior to attempting to play one or more stations on the electronic device. In one embodiment, scanning a plurality of stations and listening to a particular one station are distinguished.

In one embodiment, a method is provided for content playback selection on an electronic device. In one embodiment, the method includes rotating a dial in one or more directions. In one embodiment, the dial includes multiple segments and at least one moveable element. In one embodiment, content previewing and changing is controlled based on a finger gesture pattern. In one embodiment, the dial is moveable based on the finger gesture pattern on a touch screen of the electronic device. In one embodiment, the multiple segments of the dial are one of spaced apart at a fixed distance from one another and are variable spaced apart based on a particular finger gesture pattern on the touch screen.

In one embodiment, a method includes providing access to content. In one embodiment, an asynchronous communication link is maintained with a content source. In one embodiment, content information is prefetched for multiple pieces of content via the communication link. In one embodiment, the content information comprises an aggregate of data related to the multiple pieces of content. In one embodiment, the obtained content information is parsed out in a prefetch memory for playback on an electronic device.

In one embodiment, a method is provided for content playback selection on an electronic device. In one embodiment, the method includes rotating a dial in one or more directions. In one embodiment, the dial includes multiple segments and at least one moveable element. In one embodiment, content previewing and changing is controlled based on a finger gesture pattern. In one embodiment, the dial is moveable based on the finger gesture pattern on a touch screen of the electronic device. In one embodiment, the multiple segments of the dial are one of spaced apart at a fixed distance from one another and are variable spaced apart based on a particular finger gesture pattern on the touch screen.

Embodiments of a system, method and program product for portable communication devices, disclosed herein, provide a navigation dial user interface and module for access to content via an electronic communication device with prefetching digital content.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 3B shows an example aggregate binary format suitable for content streaming, according to an embodiment.

FIG. 3C shows an example prefetch and listening buffer download sequence, according to an embodiment.

FIG. 12 shows an example illustration of finger movement for interacting with a UI dial, according to one embodiment.

FIG. 13 shows an example illustration of finger movement interaction and a UI dial result for a first segment type, according to one embodiment.

FIG. 14 shows an example illustration of finger movement interaction and a UI dial result for a second segment type, according to one embodiment.

FIG. 15 shows an example illustration of display marker movement for a UI dial, according to one embodiment.

FIG. 16 shows an example illustration of a UI dial, according to one embodiment.

FIGS. 17-19 show example illustrations of a UI with station management and customization selections, according to one embodiment.

DETAILED DESCRIPTION

Figure 1:
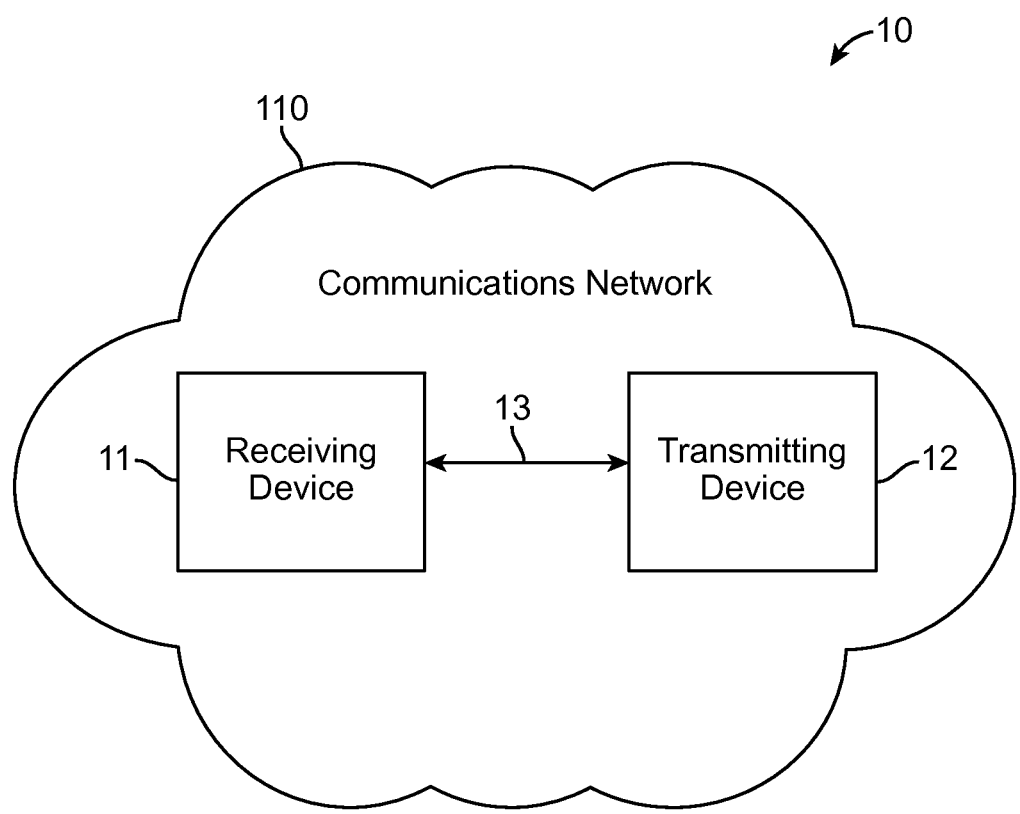
FIG. 1 shows a schematic view of a communications system, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Embodiments of a system, method and program product for portable communication devices, disclosed herein, provide smooth operation of media related playback operation, including initially establishing and periodically prefetching or prepacking digital content. It should be noted herein that one or more embodiments relate to prefetching or prepacking of digital content, and that either prefetching, prepacking or prefetching and prepacking of digital content may be used by one or more embodiments. One or more embodiments may include or pushing of digital content. In one embodiment, a method provides for content playback that includes maintaining a connection between an electronic device and a content source. In one embodiment, content is prefetched prior to attempting to play one or more stations on the electronic device. In one embodiment, scanning a multiple stations and listening to a particular one station is distinguishable.

Embodiments provide accelerated audio playback start-up and the display of related meta-data on a mobile device (e.g., smart phone, tablet, wearable device, portable computing device, etc.), such that when the user changes the content source (e.g., radio stations, video stations, etc.), the mobile device starts playing without reduced buffering time. Embodiments further provide support for a user interface (e.g., graphical user interface or UI) that allows the user to change through a number of content sources quickly. In one embodiment, the UI displayed on a touch screen of a mobile device comprises a graphic radio dial control that the user can quickly rotate.

One or more embodiments provide users the ability to navigate radio stations by genre via categorized sectors on a dial (e.g., circle, disk, 3-D sphere, etc.), where the user may choose genres on the dial, and then dial (e.g., using a finger, pointer, etc.) on a touch screen of an electronic device (e.g., an electronic device 120, FIG. 2) to change content stations. In one embodiment, the sectors divide the stations into categories or genres and serve multiple functions. In one embodiment, the dial UI provides for quick global navigation making it easier for the user to jump from one genre to another. In one embodiment, the dial UI provides the user a high level view of the station genre hierarchy while the user is still able to change station to station. In one embodiment, by allowing the user to rotate the dial UI with a single continuous finger gesture, the dial UI also allows the user to quickly change and sample (i.e., preview) stations. In one embodiment, the dial UI may also be used for navigating multiple type of content in different applications, such as photos, videos, contacts, etc.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a Blackberry®). Such protocols may include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include a mobile telephone devices, television systems, cameras, camcorders, a device with audio video capabilities, tablets, wearable devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
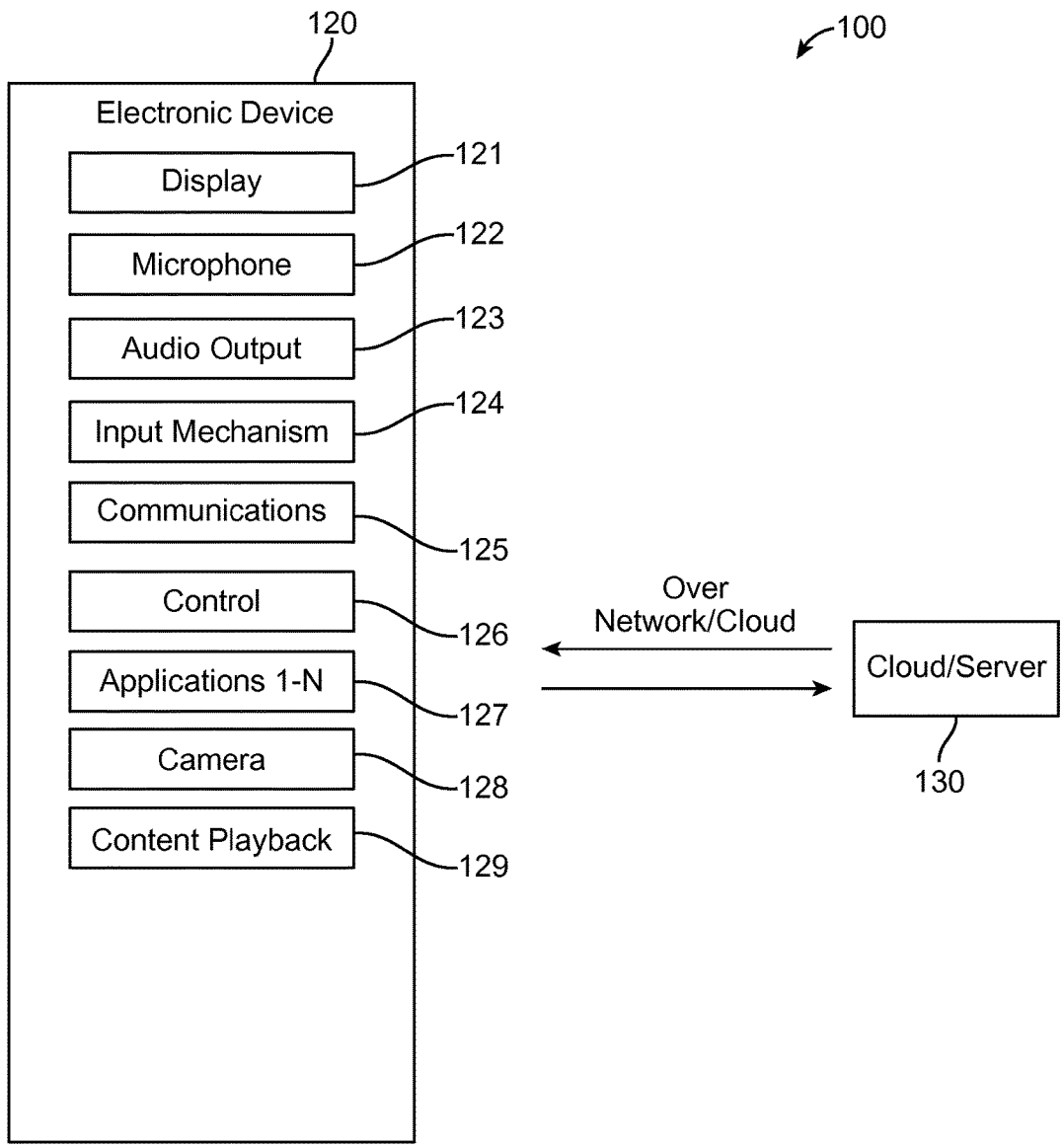
FIG. 2 shows a block diagram of architecture for a system including a mobile device including a content playback module, according to an embodiment.

FIG. 2 shows a functional block diagram of an architecture system 100 that may be used for maintaining a connection for a mobile electronic device and initially establishing and periodically pre-fetching content for playback and controlling a navigational dial user interface for playback selection in an electronic device 120. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera module 128, a content playback module 129, and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., Bluetooth® headphones or a Bluetooth® headset).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., Facebook®, Twitter®, Etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the content playback module 129 comprises processes and/or programs for processing content, such as audio, audio/visual, visual, graphic images, etc. In one or more embodiments, the content playback module 129 may comprise client 305 (FIG. 3A) playback modules as illustrated in FIG. 4.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3A:
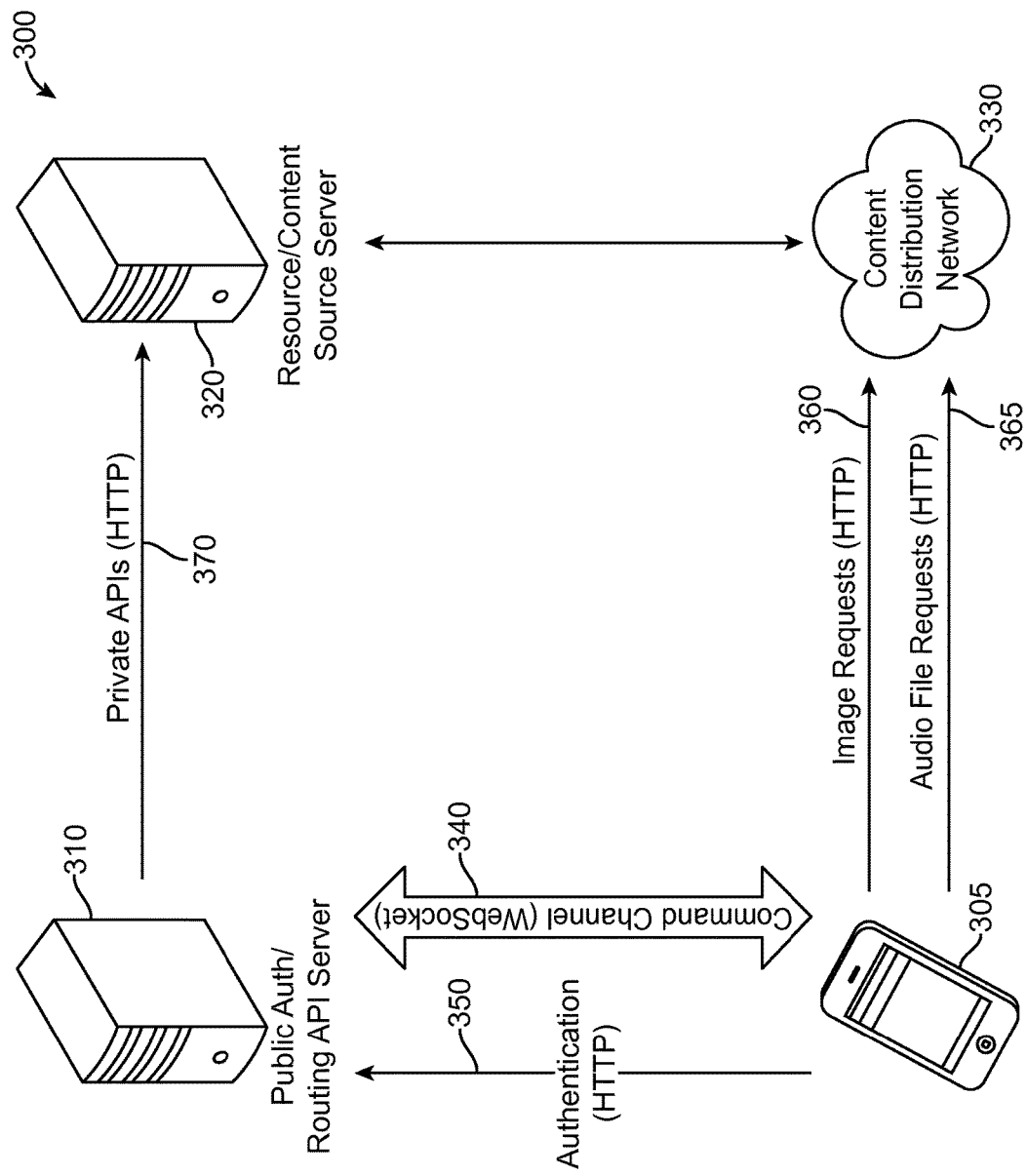
FIG. 3A shows an example block diagram for a content playback system architecture, according to an embodiment.
Figure 4:
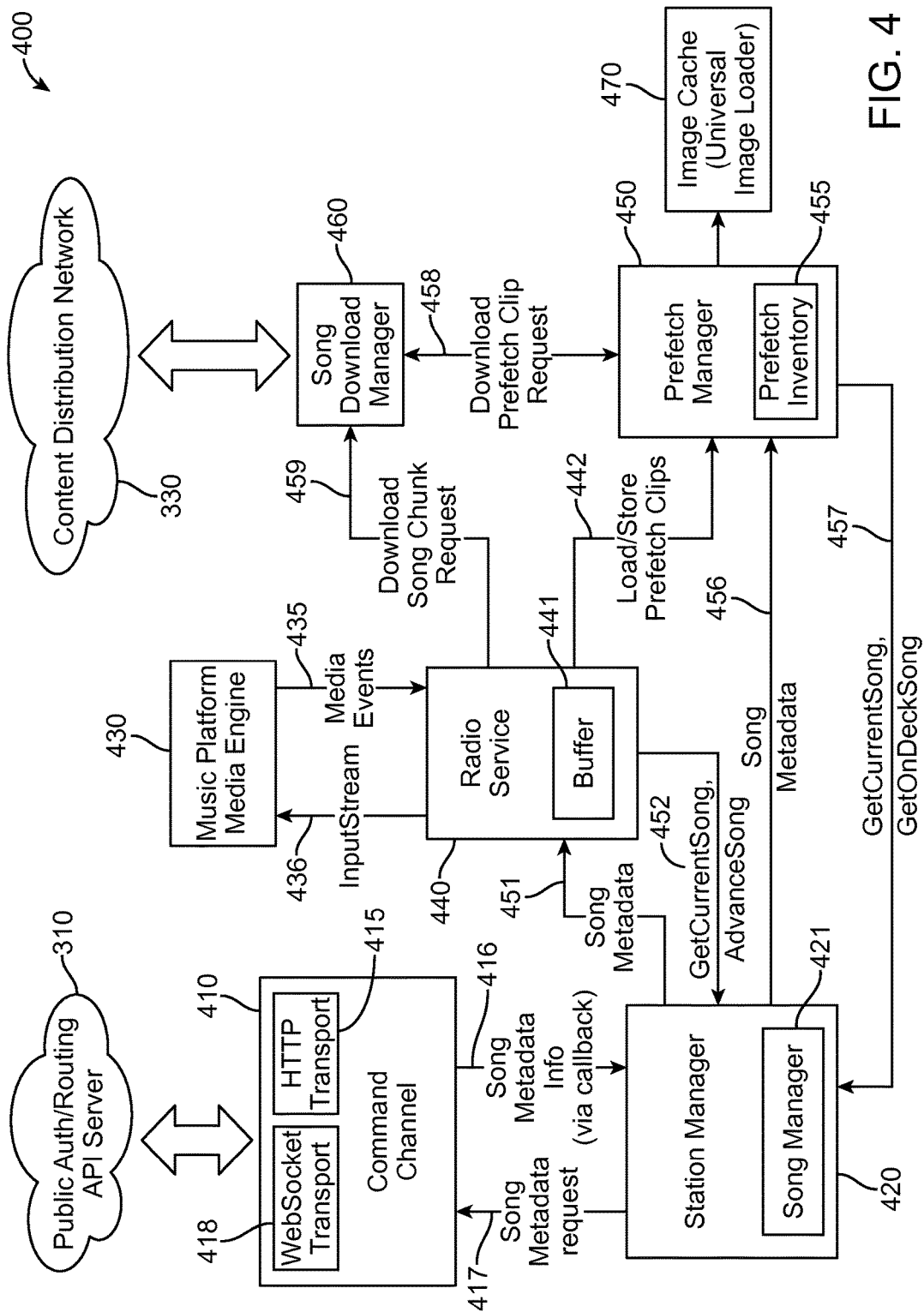
FIG. 4 shows a block diagram for a client architecture and playback system, according to an embodiment.

FIG. 3A shows an example block diagram for a content playback system architecture 300, according to an embodiment. One or more embodiments employing client 305 (e.g., electronic device 120) provide accelerated performance such as essentially instant content playback on a client, such as a mobile device content player, using an external source, such as a resource or content source (backend) server 320 via a communication link such as a wireless communication link (e.g., cellular signal) using a command channel 340. In one embodiment, the system architecture may include a public authorization or routing API server 310 that acts as a proxy for most of the resource management (other than accessing raw content) and uses private APIs (HTTP) 370 to communicate with the server 320.

In one embodiment, the server 320 communicates with a content distribution network 330 for the client 305 to obtain content (e.g., selectable content, purchasable content, free content, distributed content, etc.), which may include music, songs, video, graphics, information, etc. In one embodiment, the client 305 may communicate with the content distribution network using image requests (e.g., HTTP) 360 and audio file requests (e.g., HTTP) 365. In one embodiment, the client 305 accesses raw content (e.g., image files, audio files, etc.) directly from the content distribution network 330. One or more embodiments support high bursts of station (e.g., radio or content station, such as different genre, different playlists, simulated radio stations, etc.) changes, and provide efficient use of mobile device storage and communication bandwidth. One or more embodiments support catalog of content, such as songs and set of stations, for breadth and diversity of available content.

In one embodiment, the client 305 and server 320 keep an open WebSocket as a command channel 340 to reduce the latency for obtaining content, such as song metadata (including the song file URL and cover art URL). According to an embodiment, information such as prefetching song data (image and audio) is prefetched before attempts by a user to play one or more stations on the client 305, while distinguishing between scanning a number of different stations (e.g., spinning/turning a station dial, scanning using a scanning interface, etc.) and listening to a single station.

In one embodiment, the client 305 utilizes an Open WebSocket Command Channel 340 to the server 320, to reduce latency for mobile HTTP requests 350. In general, latency for mobile HTTP requests has two components: the time to wake-up the client 305 radio antenna, and the HTTP connect time. According to an embodiment, utilizing a WebSocket connection 340 continuously open and active by periodically sending a heartbeat signal, reduces the antenna wake-up time and associated latency. In one embodiment, server requests from the client 305 to the server 320 are asynchronous.

According to one embodiment, the client 305 prefetches content and scans stations for content. In one embodiment, the terms used herein for prefetching and scanning may include: a currently playing song, an on-deck (e.g., next up) song, preview clip (e.g., portion of playable content), scan mode, listen mode, and listening expiration.

In one embodiment, a currently playing song is the current song that is being played on the currently playing station. In one embodiment, the on-deck song, for songs that are not being played on the currently playing station, is the next song to be played. In one embodiment, for the currently playing station, the on-deck song is the upcoming song after the currently playing song.

In one embodiment, the preview clip includes the next N seconds (i.e., preview clip length) of the on-deck song of a station (N being a positive number). In one embodiment, the preview clip is the first N seconds. In other embodiments, in cases where the user has listened to the station recently, the preview clip may be N seconds in the middle of the song. In one embodiment, preview clips are stored in a file system (e.g., not in electronic device 120 local memory, such as cache, RAM, etc.). In one embodiment, the file system may be located on the content distribution network 330, on the client 305, or an external storage device.

In one embodiment, for scan mode, when a player application executing on the client 305 switches to a new station, during the first X seconds of playback, the station is considered to be in scan mode (X being a positive number). In one embodiment, no additional requests for song audio data are made while in scan mode. In one embodiment, if the station is changed or stopped while it is still in scan mode, the current play progress location for the station remains unchanged. In one embodiment, playing the station again starts play from the same location that it last started at.

In one embodiment, for listen mode, after the station plays for X seconds, the mode switches to listen mode. In one embodiment, in listen mode, if the size of the remaining audio buffer (e.g., a buffer in memory of the client 305) is below a minimum threshold, more audio data is requested from the server 320 from the client 305. In one embodiment, for listening expiration, when a station is in listen mode and has changed to another station, an implicit timer starts for the current song. In one embodiment, the timer period may either be a fixed period (e.g., 10 minutes) or based on the remaining time of the current song. In one embodiment, when the timer period passes, the song playback reaches its listening expiration and is considered "consumed." In one embodiment, a determination is made for a new on-deck song for the station and a new preview clip is fetched.

According to one embodiment, for by the client 305 to efficiently prefetch the preview clips, cover art, and metadata for all the on-deck songs of all the stations, utilizing a cold start function the server 320 maintains a canned aggregate binary of all of the station information.

FIG. 3B shows an example aggregate binary format suitable for content streaming, according to an embodiment. In one embodiment, the example format shown in FIG. 3B is suitable for content streaming. In one embodiment, the prefetched data for songs at the beginning of a content file may be processed before the rest of the aggregate binary can be fully downloaded. In one embodiment, to keep the aggregate binary below a certain size, it may be divided into multiple portions. In other embodiments, the format of the aggregate binary may be different than the example provided in FIG. 3B. In one example embodiment, the aggregate binary may include a simple header structure preceding each song section. On one embodiment, a utility such as GZIP may be utilized for aggregating a set of files for ease of use.

According to one embodiment, the client 305 uses a warm start function when content playback (e.g., using the content playback module 129, FIG. 2) is started again after a prior playback (which provided an opportunity for the client 305 to fetch data for all of the stations), all the saved preview clips are enumerated. In one embodiment, if any songs have reached their listening expiration, the songs are removed and requests for new songs and preview clips are queued up by the client 305. In one embodiment, a list of song IDs for the un-expired preview clips are gathered and sent to the server 320 to verify that these songs are still valid songs in a catalog (e.g., song collection). In one embodiment, if any songs have been removed from the catalog, requests for new songs and preview clips are generated by the client 305 to replace them.

FIG. 3C shows an example prefetch and listening buffer download sequence, according to an embodiment. In one example embodiment, a basic sequence for station playback on the client 305 comprises the following. In one embodiment, Load Preview Clip—includes copying a saved preview clip from the file system into the in-memory audio buffer of the client 305. In one embodiment, Listening Mode Threshold—includes playing the in-memory preview clip until a particular listening mode threshold is reached (e.g., a particular time, a particular amount of content, etc.). In one embodiment, before the particular listening mode threshold is reached, the station is considered to be in Scan Mode. In one embodiment, no additional audio data is requested in scan mode. In one embodiment, a song is not considered to be "listened to" yet while in scan mode. In one embodiment, once the listening mode threshold is reached, it is determined if the remaining audio buffer content is below a minimum value or threshold (e.g., content size amount in the buffer). In one embodiment, if the audio buffer content is below the minimum value or threshold (which it usually is when switching from scan mode to listening mode), requests for more audio data by the client 305 to the server 320 are generated.

In one embodiment, Request Next Song Preview Clip—includes once a first audio chunk is received following the preview clip, it is determined if the remaining audio buffer (e.g., size amount of content/data) is above a minimum value (e.g., selected, assigned, determined automatically/dynamically) or threshold. In one embodiment, if the remaining audio buffer content is above the minimum amount or threshold, a request for the preview clip of the current station's on-deck song is triggered by the client 305.

In one embodiment, Request Next Audio Chunk—includes that when the play progress reaches a point where the remaining audio buffer content is below a certain minimum or threshold size/amount, requests for more audio data are generated by the client 305. In one embodiment, the Request Next Audio Chunk process is repeated until the end of a song is reached.

FIG. 4 shows a block diagram for a client architecture and playback system 400, according to an embodiment. In one embodiment, the system 400 includes components that may be included in client 305 (FIG. 3A) or offloaded/executed on a server (e.g., a public authorization or routing API server 310) or network (e.g., the content distribution network 330). In one embodiment, the system 400 components may include a command channel module 410, station manager module 420, music platform media engine 430, radio service module 440, prefetch manager module 450, song download manager module 460 and image cache 470. In one embodiment, the command channel module 410 communicates with the public authorization or routing API server 310. In one embodiment, the song download manager module 460 communicates with the content distribution network 330.

In one embodiment, every station has at least two songs associated with it, the current song and the on-deck song. In one embodiment, each song may be in one of the following three station song states: Unknown, MetadataLoaded, and Buffered. In one embodiment, the Unknown state indicates that the song is unknown and no metadata for the song is yet obtained by the song download manager module 460. In one embodiment, the MetadataLoaded state indicates that the metadata for the song (including song URL and cover art URL) is obtained, but sufficient audio data has not yet been obtained by the song download manager module 460. In one embodiment, the Buffered state indicates that the metadata for the song as well as a minimum amount of audio buffer content required to start or continue playing, are available to the client 305.

In one embodiment, in order to reduce latency, a WebSocket is maintained open for server requests (other than for content files) from the command channel module 410 to the public authorization or routing API server 310. In one embodiment, the server requests to the public authorization or routing API server 310 are asynchronous utilizing an asynchronous command channel (e.g., command channel 340, FIG. 3A). In one embodiment, instead of a conventional HTTP request where a request is made and then there is a wait for a response (in the same control flow), by contrast in a WebSocket asynchronous command channel, a mechanism is employed to send and receive messages in full duplex communication (i.e., not an RPC call).

According to one embodiment, where it is not possible to persist entire song tracks in the file system, a clear distinction is made between preview clips and the currently playing buffer content. In one embodiment, preview clips are meant for all songs other than the currently playing song, and are only saved on the file system (as opposed to a buffer 441). In one embodiment, the currently playing buffer content is meant for the currently playing song and is only maintained as a buffer 441. In one embodiment, when switching songs (either because of station switch, user selecting next song, or reaching end of a song), audio data is swapped at 442 between the buffer 441 and the prefetch clip files from the prefetch inventory 455.

In one embodiment, the command channel module 410 provides an interface to the public authorization or routing API server 310, and includes transports (WebSocket Transport 418 and HTTP transport 415). In one embodiment, all server requests other than accessing content are handled via the command channel module 410. In one embodiment, the command channel module 410 provides for multi-transport support using a separate transport layer and supports two different types of transports for a command channel. In one embodiment, the transport layer of the command channel module 410 enables sending and receiving JavaScript Object Notation (JSON) over different kinds of protocols/transports. In one embodiment, the WebSocket Transport 410 is a preferred transport using WebSocket for performance reasons. In one embodiment, the HTTP Transport 415 is used if the client 305 (FIG. 3A) is unable to make a WebSocket connection to the public authorization or routing API server 310, where the command channel module 410 reverts to the HTTP Transport 415. In one example embodiment, the HTTP Transport 415 may be used in case of WebSocket unavailability.

In one embodiment, the client 305 utilizes a "Ready for Quick Change" mode, such as when the user has his/her finger on a radio station dial of the UI. In one embodiment, while in the "Ready for Quick Change" mode, a periodic heartbeat signal is transmitted to keep the client 305 device radio antenna active, which reduces latency in server requests.

In one embodiment, the transport layer of the command channel module 410 supports JSON (sends and receives JSON). In one embodiment, the Command channel module 410 request methods take in Java primitives and objects. In one example embodiment, the callback methods support response objects. In one embodiment, the command channel module 410 handles the conversion back and forth between Java objects and JSON.

In one embodiment, the command channel module includes the following methods or processing: Peek, Next, Stop, Verifysongs, and Register Callback. In one embodiment, Peek includes sending a request to the public authorization or routing API server 310 to act as the proxy to obtain the next song for a station. In one embodiment, Next includes sending a request to the public authorization or routing API server 310, which acts as a proxy to the server 320 for indicating start of playing the current song by the music platform media engine 430. In one embodiment, the server 320 should return the current song as well as the on-deck song.

In one embodiment, Stop includes sending a request to the public authorization or routing API server 310 that acts as a proxy to the server 320 and indicates playing the station stopped. In one embodiment, VerifySongs includes sending a list of song identifications (i.e., IDs) to the public authorization or routing API server 310 for acting as the proxy to the server 320 to verify that they are still valid songs.

In one embodiment, Register Callback includes registering a listener to invoke when the server 320 sends a JSON message (typically in response to a request).

In one embodiment, the station manager module 420 manages the state of stations and current song and on-deck (next) song. In one example embodiment, the station manager module 420 is the main consumer of the command channel module 410. In one embodiment, the station manager module 420 includes a song manager helper object 421 to help manage when a song reaches its listening expiration and is considered no longer current on a station.

In one embodiment, the station manager module 420 provides the following features: Command Channel Callback 416 and Song Manager object 421. In one embodiment, in addition to sending requests to the Command Channel module 410 (i.e., song metadata request 417), the station manager module 420 registers as a SongMetadata listener. In one embodiment, when the station manager module 420 receives a SongMetadata message from the public authorization or routing API server 310, the station manager module 420 updates station and song tables and, depending on the currently playing song, either triggers the prefetch manager module 450 or the radio service module 440 to download audio data.

In one embodiment, the song manager object 421 is a helper utility that supports track Song consumption/timeouts and keeps track of which songs have been "played" while in listening mode (as opposed to just "previewed" while in scan mode). In one embodiment, after some period, after a song has been "played" (e.g., for a fixed period or some factor of the song length), the song manager module 420 removes the song from the system (clear database tables of any references, remove any prefetch file) and if necessary, advances to the next song of any corresponding station. In one embodiment, the station manager sends song metadata at 451 to the radio service module 440, and at 456 to the prefetch manager module 450. In one embodiment, the station manager module 420 receives a GetCurrentSong or AdvanceSong request at 452 from the radio service module 440, and GetCurrentSong or GetOnDeckSong requests at 457 from the prefetch manager module 450.

In one embodiment, the prefetch manager module 450 implements prefetching using the following functions: Cold-start Bulk Download, Prefetch Song and CheckOnDeckPrefetch. In one embodiment, the Cold-start Bulk Download comprises a process that downloads an aggregate binary (see, e.g., FIG. 3B) that contains all of the stations' first song metadata, preview clip, and cover-art. In one embodiment, the prefetch manager module 440 parses out the station data as it streams in and populates the station/song tables, Image Cache 470, and prefetch inventory 455. In one embodiment, the prefetch manager loads/stores prefetch clips at 442 from the radio service module 440.

In one embodiment, Prefetch Song comprises a process that downloads a song's preview clip and cover art and stores them in the prefetch inventory 455 and image cache 470. In one embodiment, the CheckOnDeckPrefetch is used when the radio service module 440 is progressively downloading a song and receives an audio chunk (based on a song chunk request at 459), and comprises a process that is used to check if the currently playing song has sufficient buffer (content) left. In one embodiment, if the currently playing song does have sufficient buffer left and the next (on-deck) song has not been prefetched yet, a song prefetch request is triggered at 458.

In one embodiment, the radio service module 440 provides continuous playback of a station. In one example embodiment, the radio service module 440 is the main hub for playback and manages the interactions between the music platform media engine 430, the station manager module 420, the prefetch manager module 450, and the song download manager module 460. In one embodiment, the radio service includes the following functions: interact with the music platform (progressive playback) media engine 430, buffer 441, Playback Control Methods, interact with the station manager module 420, and use the prefetch inventory 455.

In one embodiment, the function of interacting with the music platform media engine 430 includes the radio service module 440 driving the music platform media engine 430 by generating and passing an InputStream at 436 to the music platform media engine 430. In one embodiment, the radio service module 440 further handles all the media event callbacks at 435.

In one embodiment, the buffer 441 is used as follows. The radio service module 440 implements the InputStream at 436 that is passed to the music platform media engine 430 as a buffer 441. In one embodiment, the playback control methods include the radio service module 440 exposing APIs to control playback (e.g., play, stop, skip, change station, etc.). In one embodiment, these methods are used by the player UI and widgets of the client 305.

In one embodiment, the radio service module 440 interact with the station manager 420 by calling the station manager module 420 to obtain the current song and advance to the next song. In one embodiment, the radio service module 440 implements the station manager callback that is used when a song's metadata is provided (at 416) by the public authorization or routing API server 310 via the command channel module 410. In one embodiment, the callback is used in the rare case when the radio service module 440 attempts to access a station's current song, but the station manager module 420 does not have access yet.

In one embodiment, the radio service module 440 uses the prefetch inventory 455 to load and store prefetch clips. In one embodiment, when the radio service module 440 starts playing a new song, the radio service module 440 invokes the prefetch inventory 455 to load any prefetched audio data for the song into the buffer 441. In one example embodiment, when the radio service module 440 stops playing a song before the song's end, the prefetch manager module 450 uses the prefetch inventory 455 to save unused audio data in the buffer 441 into a persistent preview clip.

In one or more embodiments, the client 305 further includes the image cache 470, such as an Android Universal Image Loader, a Song Download Manager and an Authentication module for integration with a server account.

In one embodiment, the client 305 employs an Open WebSocket Command Channel function for server-client interaction providing instant station start, where the client 305 prefetches previews for all stations (audio and album image) in one large file from a content delivery network (CDN) (e.g., content distribution network 330). In one embodiment, the client 305 provides for accelerated station change where the client 305 maintains a long live connection to the server 320 (via the public authorization or routing API server 310 acting as proxy) for pipelining commands (through the command channel 340, FIG. 3A). In one embodiment, the client 305 uses a secondary connection for content streaming (e.g., Content Channels). In one embodiment, the secondary connection allows sub-second response to streaming requests on a mobile network.

In one embodiment, in order to reduce latency on the network and operating system (OS), the public authorization or routing API server 310 provides the control channel (i.e., command channel 340) where the client 305 may maintain a live connection thereto. In one example embodiment, for a mobile network, WebSocket is used for the control channel. In another example embodiment, HTTP keep-alive and HTTP long pull (Comet) may be used. In one embodiment, in case WebSocket is not available, the client 305 falls back to standard HTTP 1.0 or HTTP 1.1, to keep the connection with the public authorization or routing API server 310 alive. In one embodiment, the client 305 comprises an application module or logic on a mobile device (e.g., electronic device 120, FIG. 2). In one embodiment, the server 320 comprises modules for responding to requests from the client 305 and providing information, as described herein.

Figure 5:
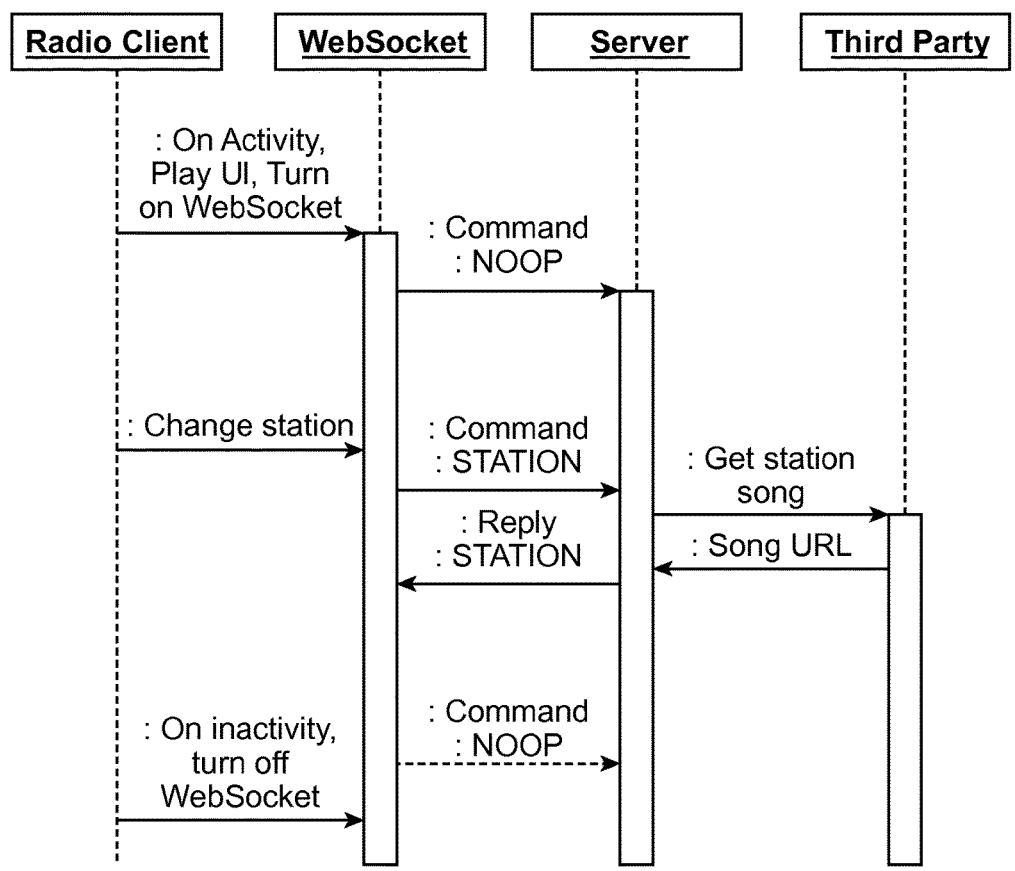
FIG. 5 shows a sequence diagram for content playback for a content playback client, according to an embodiment.

FIG. 5 shows a sequence diagram 600 for content playback for a content playback client (e.g., client 305, FIG. 3A), according to an embodiment. According to one embodiment, a control channel is implemented such that after a period of inactivity, in a mobile network, the client 305 reduces radio power to improve battery life. In one example embodiment, the client 305 performs partial power down of the content playback module 129 in, for example, 8 seconds if network usage is less than, for example, 128 bytes. In one example embodiment, the dedicated control channel reduces latency in the mobile network by removing a HTTP handshake and connection time. In one embodiment, the command channel module 410 (FIG. 4) on the client 305 may be selectively kept active.

In one embodiment, full duplex communication is provided to improve responsiveness of the client 305. In one embodiment, network byte overhead is reduced (i.e., HTTP headers are eliminated). In one embodiment, the control channel enables a command pipeline and improved response. In one embodiment, multimedia data is handled via separate channel(s). In one embodiment, in a mobile network, the client 305 should ping e.g., 130 bytes of data, to the public authorization or routing API server 310 periodically, for example every 7 seconds, to keep the content playback module 129 active.

In one embodiment, the client logic for running the control channel is based on user's probability of fetching content. In one example embodiment, when the client 305 is expecting user interaction to change channel/content (e.g., station, images, etc.), the control channel is enabled ahead of time. In one embodiment, a control channel ping pattern is performed, and the client stops pinging when probability of user interaction is below a particular threshold. In one embodiment, the client 305 closes the control channel if a media player application is running in the background of the client 305. In one embodiment, the control channel is implemented using WebSocket (HTTP upgrade protocol). In one embodiment, the WebSocket in a mobile network may be implemented on a port 8080, as an alternate HTTP port. In one example embodiment, negotiating a WebSocket comprises, on WIFI, using port 80, then port 8080. In one embodiment, on a mobile network, port 8080 may be used. In one embodiment, defaulting to generic HTTP protocol is implemented for the client 305 if the WebSocket connection fails. In one example embodiment, the client 305 remembers the last successful connection setting(s) for WIFI/mobile network. As illustrated, the sequence diagram 600 shows an example client-server interaction sequence using WebSocket, according to an embodiment.

Figure 6:
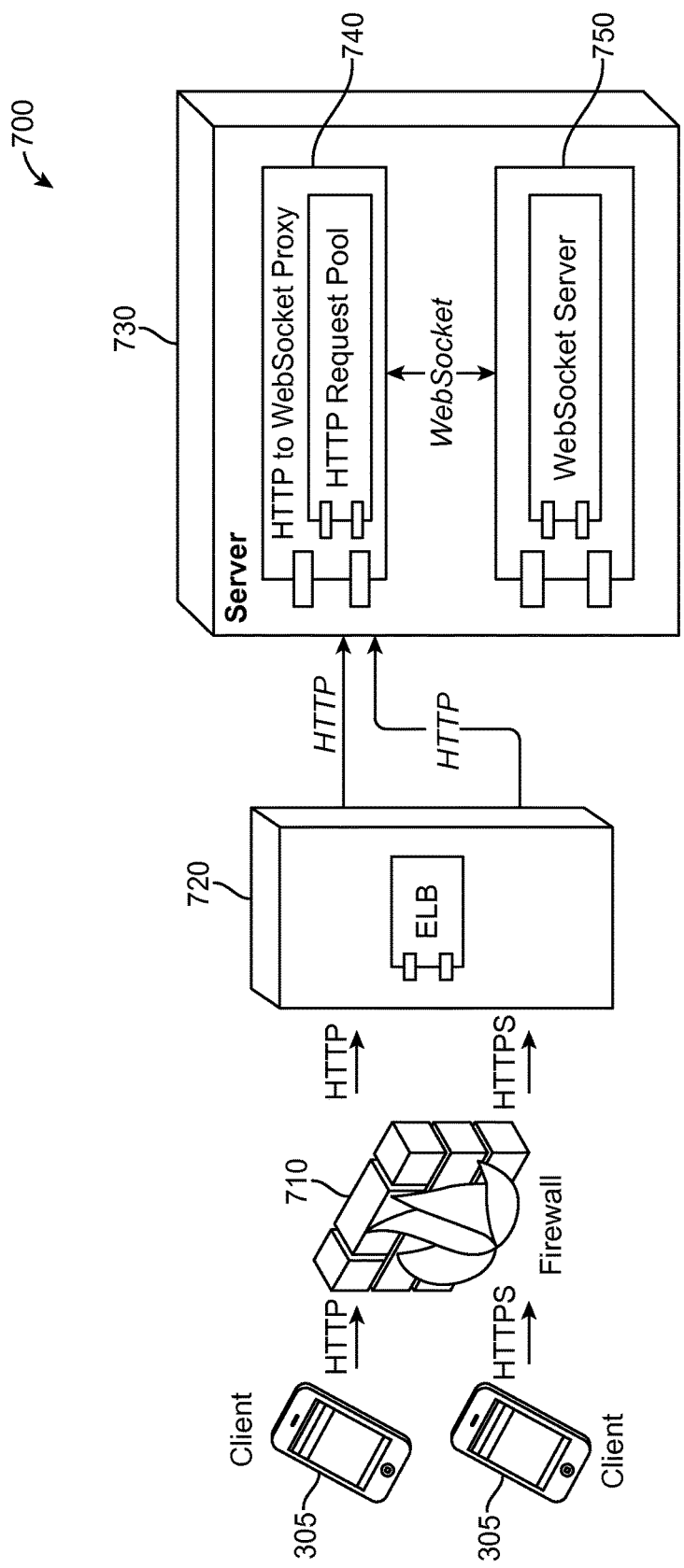
FIG. 6 shows an example HTTP to WebSocket proxy, according to an embodiment.

FIG. 6 shows an example block diagram 700 for HTTP to WebSocket proxy, according to an embodiment. In one embodiment, the server control channel and API utilize WebSocket. In another embodiment, if HTTP proxies and firewalls 710 will not allow WebSocket protocol, the client 305 falls back to standard HTTP requests and the requests (HTTP to WebSocket Proxy) are handled as in diagram 700.

In one embodiment, client 305 behavior may include: the client 305 always uses HTTPS for registration/login purpose as a load balancer (ELB) 720 may not support wss. In one embodiment, upon successful login, the client 305 attempts to open a WebSocket connection and ping the server 730. In one embodiment, upon successful ping back from the server 730, the client 305 calls a server API via WebSocket using the HTTP to WebSocket Proxy 740 and WebSocket application server 750. In one embodiment, if the ping message fails, the client 305 falls back to an HTTP/HTTPS connection.

In one embodiment, the ELB 720 behavior includes: on HTTP requests, the ELB 720 forwards to proxy using HTTP. In one embodiment, on HTTPS requests, the ELB 720 forwards to proxy using HTTP. In one embodiment, on WebSocket requests, the ELB 720 forwards to an application server 750. In one embodiment, Proxy behavior includes: on start, the Proxy 740 attempts to establish a WebSocket connection to the application server 750.

In one embodiment, after the WebSocket connection is established, the Proxy 740 starts serving all HTTP requests. In one embodiment, on receiving an HTTP request from the client 305, the Proxy 740 parses the request, keeps it in a local pool, and sends another request to the application server 750 through WebSocket connection. In one embodiment, on receiving a response from the application server 750, the Proxy 740 fetches the initial HTTP response and pipes the response through.

In one embodiment, HTTP requests in the HTTP local pool will time out after a certain interval and be auto deleted. In one embodiment, if the WebSocket connection with the application server 750 is interrupted or lost, the Proxy 740 repeatedly attempts to reconnect.

Figure 7:
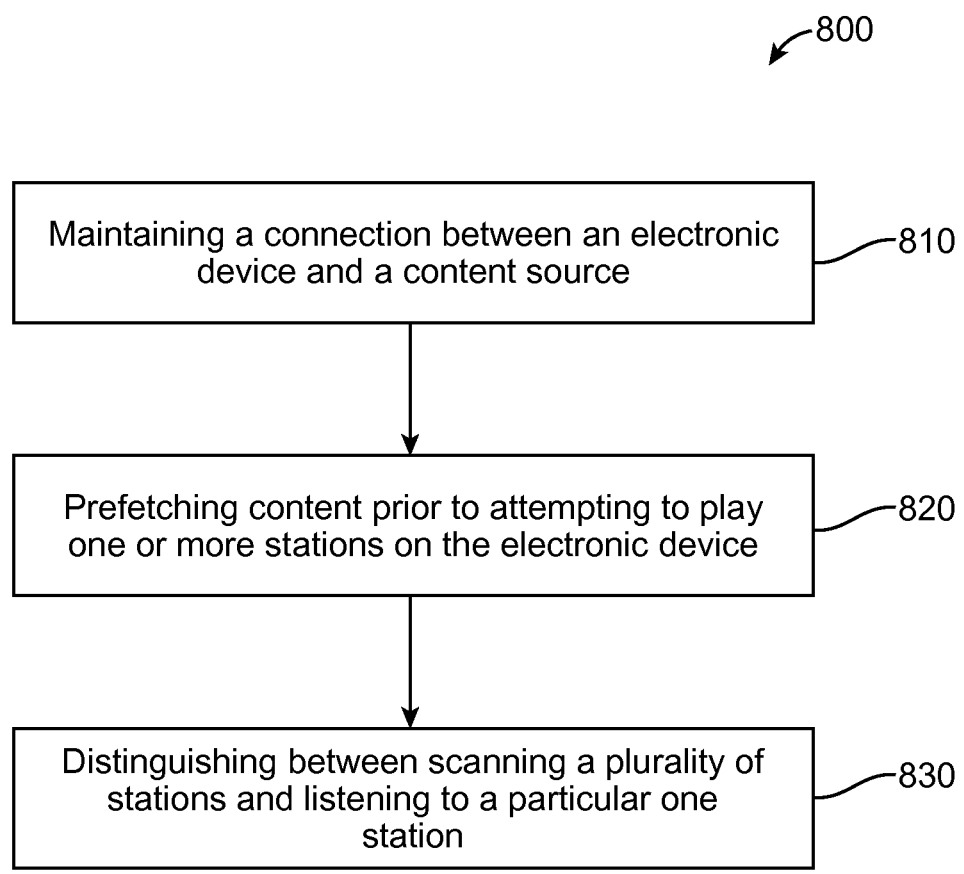
FIG. 7 shows block diagram for a process for content playback, according to one embodiment.

FIG. 7 shows a block diagram for a process 800 for content playback for an electronic device (e.g., electronic device 120, FIG. 2). In one embodiment, in block 810, a connection (e.g., command channel 340, FIG. 3A) between an electronic device (client 305, FIG. 3A, such as an electronic device 120) and a content source (e.g., resource/content source server 320 (e.g., via proxy server 310) is maintained. In one embodiment, in block 820, content is prefetched prior to attempting to play one or more stations on the electronic device.

In one embodiment, in block 830, it is able to distinguish between scanning multiple different stations and listening to a particular one station (e.g., from a listener's point of view). In one embodiment, in process 800 the maintained connection comprises an open command channel with the content source, and prefetching content comprises prefetching preview content clips, cover art, and metadata for all on-deck content for the multiple different stations. In one embodiment, the open command channel comprises an Open WebSocket command channel.

In one embodiment, process 800 may further include sending a heartbeat signal periodically to the client for reducing antenna wakeup time and associated latency. In one embodiment, process 800 may include loading a preview content clip from a file system into a buffer in memory of the client, and playing the preview content clip until a particular listening mode time threshold is reached. In one embodiment, playback remains in a scan mode prior to reaching the particular listening mode time threshold, and after the particular listening mode time threshold is reached, process 800 checks if content in the buffer is below a first particular storage size threshold; and if the content in the buffer is below the first particular storage size threshold, process 800 requests additional content data.

In one embodiment, process 800 may further include determining if the content in the buffer is above the first particular storage size threshold, and if the content in the buffer is above the first particular storage size threshold then triggering a request for a preview content clip of next content available for playback of a current selected station. In one embodiment, upon playback reaching a particular point and remaining content in the buffer is below a second particular storage size threshold for content being played on the current selected station, then process 800 includes requesting additional content data.

In one embodiment, process 800 the content may comprise one or more of audio data, video data, and audio and video data. In one embodiment, in process 800 requests to the server may comprise asynchronous requests and communication with the server comprises full duplex communication. In one embodiment, the command channel may comprise a separate transport layer and supports at least two different transports. In one embodiment, in process 800 the maintained connection may be based on a standard HTTP connection with keep alive enabled.

In one embodiment, process 800 further includes establishing, by a proxy (e.g., server 310, FIG. 3A, proxy server 740, FIG. 6, etc.), the connection between the client 305 or electronic device 120 (FIG. 2) and the content source (e.g., server 320, server 750, etc.) via a WebSocket connection. In one embodiment, process 800 includes serving all HTTP requests by the proxy after the connection is established. In one embodiment, process 800 further includes upon receiving an HTTP request from the electronic device, parsing, by the proxy, the HTTP request, maintaining the HTTP request in an HTTP local pool, and sending another HTTP request to the content source through the WebSocket connection. In one embodiment, process 800 also includes upon receiving a response from the content source, fetching, by the proxy, an initial HTTP response and piping the response. In one embodiment, HTTP requests in the HTTP local pool times out after a particular time interval and are dynamically or automatically deleted.

In one embodiment, in process 800 upon the WebSocket connection being interrupted or lost, the proxy attempts to reestablish the WebSocket connection.

In one embodiment, a process for providing access to content includes an asynchronous communication link that is maintained with a content source. In one embodiment, content information is prefetched for multiple pieces of content via the communication link. In one embodiment, the content information comprises an aggregate of data related to the multiple pieces of content. In one embodiment, the obtained content information is parsed out in a prefetch memory for playback on an electronic device.

In one embodiment, the process for providing access to content includes temporally presenting the obtained content information from the prefetch memory for selection by a user, and playing back at least one selected piece of content in the multiple pieces of content. In one embodiment, the process further includes periodically prefetching content information for one or more of said multiple pieces of content based on a playback expiration period for each piece of content in said multiple pieces of content. In one example embodiment, prefetching content information may include prefetching radio station data for the content and caching it on the electronic device. In one example embodiment, prefetching content information may include prefetching content information for all content for initiating access to content. In one embodiment, prefetching content information may include prefetching station information for a selected set of content after initiating access to content. In one embodiment, the process for providing access to content may include retrieving content metadata from the cached information as the user skips content on the electronic device in process of selecting content for playback.

Figure 8:
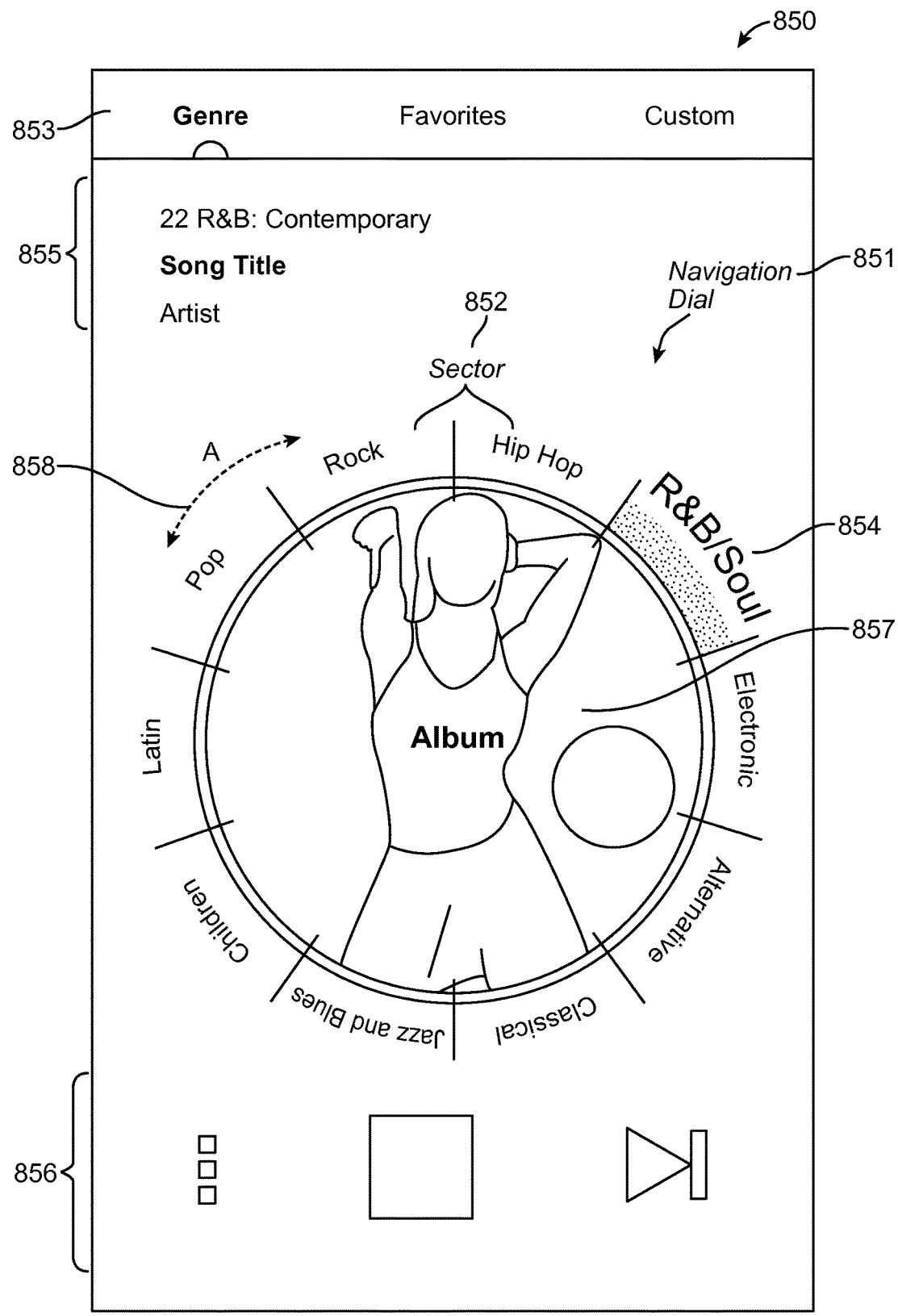
FIG. 8 shows an example user interface (UI) for station selection and content playback, according to one embodiment.

FIG. 8 shows an example UI 850 for station selection and content playback, according to one embodiment. One embodiment enables navigation of radio stations by genre via categorized sectors 852 on a content navigation UI comprising a dial UI 851 (e.g., essentially circular, 3-D sphere, etc.) displayed on, for example, a touch screen display of an electronic device 120 (FIG. 2). In one embodiment, the user may choose genres on the dial UI 851 (e.g., customize the dial with selected genre, choose default genre, etc.), and then dial (e.g., sliding a finger in the directions "A" 858 and tapping a finger on the touch screen) on the touch screen to change stations (as if the dial UI is a "spinning" dial (in any direction).

In one example embodiment, the UI 850 includes a selection portion 853 where the user may select genre, favorites, custom, etc. for display on the dial UI 851. In one example embodiment, the genre selection may use a default set of genre, provide another menu (e.g., a dropdown menu, or other selectable menu) for selecting a number of genre to display. In one example embodiment, the favorites selection may provide for a user to choose a number of most recently selected stations of genre, most popular based on profile content (e.g., based on a users age, region, likes, etc.), selected favorite genre, etc. In one embodiment, the custom selection provides for the user to customize the UI dial 851 with a particular number and type of genre, use custom stations for genre, etc.

In one embodiment, the UI dial 851 provides an indication/indicator 854 for a currently dialed station or genre. In one example embodiment, the indicator 854 may be a line, arrow, or other graphical indication for the selected station or genre. In one embodiment, the indicator 854 may include a particular color or highlight color for the genre title or background behind the station or genre, enlarged letters, or other types of graphical indication to alert a user of the current position of the UI dial 851 with respect to a station or genre. In one embodiment, the type and number of genre that may be selected for display on the UI dial 851 may change over time based on available genre/stations. In one embodiment, the UI dial is moveable in one or more directions (e.g., clockwise, counterclockwise, etc.). In one embodiment, the indicator 854 is one of stationary or moveable. In one embodiment, the indicator 854 rotates around the various genres or stations. In another embodiment, the indicator is fixed and the genre or stations rotates with the UI dial 851.

In one embodiment, the UI 850 may include a legend 855 for including information on a current playing station/genre/song. In one example embodiment, the number and type of genre/station may be displayed, album title, the title of song or track, time remaining to play, etc.

In one embodiment, the UI 850 includes a control UI 856 for controlling the play of a station. In one embodiment, the control UI 856 may include a graphic element for stopping, playing, pausing, fast forward, forward, rewind, skipping, etc. In one embodiment, the control UI 856 may include graphic elements for sharing a song, album, station, etc. with others via various selections, such as social media, text messaging, email, etc.

In one embodiment, the UI 850 includes a background display portion 857 that may include photographs and graphics from the station, genre, album, song, user selected photographs or graphics, etc.

Figure 9:
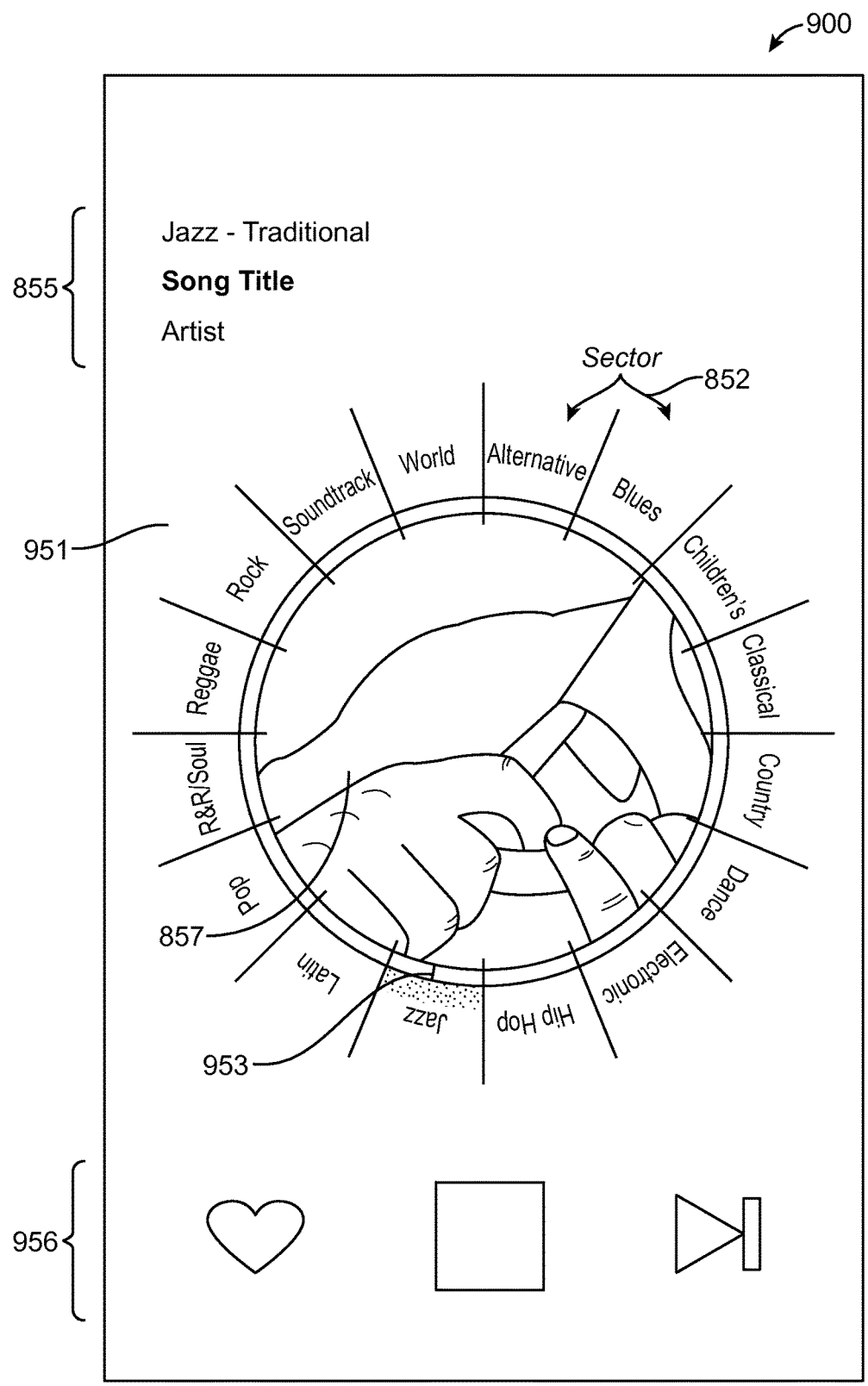
FIG. 9 shows another example UI for station selection and content playback, according to one embodiment.

FIG. 9 shows another example UI 900 for station selection and content playback, according to one embodiment. In one embodiment, the sectors 852 divide the stations into categories or genres and serve multiple purposes. In one embodiment, the sectors 852 provide for quick global navigation, making it easier for the user to jump from one genre to another. In one embodiment, the sectors 852 provide the user a high level view of the station genre hierarchy while the user is still able to change station to station. One or more embodiments provide for a user to rotate the UI dial 951 with various finger gesture patterns, which allows the user to speed up or slow down the input and output of the dial controller module 1010 (FIG. 10) to quickly change and sample or preview stations. In one embodiment, each sector 852 is associated with a particular content group, such as genre, station (e.g., music, radio, video station), photo collection or album, types of photos, types of videos, content collections (e.g., email collections, text collections (e.g., books, stories, poems, news, articles, etc.), etc.

In one or more embodiments, instead of the conventional folder/list hierarchy navigation that requires users to drill down into each folder (or genre), a content navigation UI 900 is provided that displays the genre groupings within the same view as the individual stations. In one embodiment, the content navigation UI 900 rotating dial UI 951 metaphor allows for quick station changes and browsing. In one embodiment, the genre sectors 852 allow for quick navigation to specific genres by rotating the dial backwards/forwards and selecting a station. According to an embodiment, the content navigation UI 900 allows for quick browsing and sampling of stations, giving the user the ability to "station surf." In one embodiment, at the same time, the content navigation UI 900 allows the user to easily find and navigate to a specific genre (or group) of stations.

In one example embodiment, the dial UI 951 may expand or contract based on the number of genre selected and/or displayed. In one example embodiment, the sectors 852 are indicated by separating graphics (e.g., lines, or other markings). In another example embodiment, the sectors 852 are separated by invisible markings and may just be based on a particular distance based on the number of genre, letters or other indicia for the genre/station, etc.

In one embodiment, the currently selected station or genre may be highlighted with a particular color, shade or brightness, by use of an indicator 953, etc. In one embodiment, the indicator 953 or other indicating graphics may be user selectable. In one embodiment, the control UI 956 may include graphics for controlling the play of the station similar to the control UI 856 (FIG. 8), but the control indicators may be based on type of music playing or genre (e.g., a heart graphic for a song/music categorized as a favorite song or based on type of song, such as a love song, etc.). In one embodiment, the control indicators or icons of the control UI 956 are user selectable based on genre, type of song/music, artist, personal selected, etc.

In one embodiment, the dial UI 951 may also include information indicating what other friends of the user may be listening to at the same time. In one example embodiment, the indication for a friend(s), relative, etc. may include highlighting a different color, graphic or text indication, etc. In one example embodiment, the indication for other users may be selectable by the present user in order to switch to a same song or station. In one embodiment, the indicator may provide for the user to restart the music or song, change to the station or genre, or connect to the song/music at the same place in the song or music (or close) so that both/multiple users may listen to the same song/music simultaneously or close to simultaneously.

In one example embodiment, the dial UI 951 may also indicate what other users are listening to within a particular range (e.g., 10 ft., 25 ft., 50 ft., 25 yards, 100 yards, etc.) based on information from sources, such as GPS, Bluetooth, etc.

Figure 10:
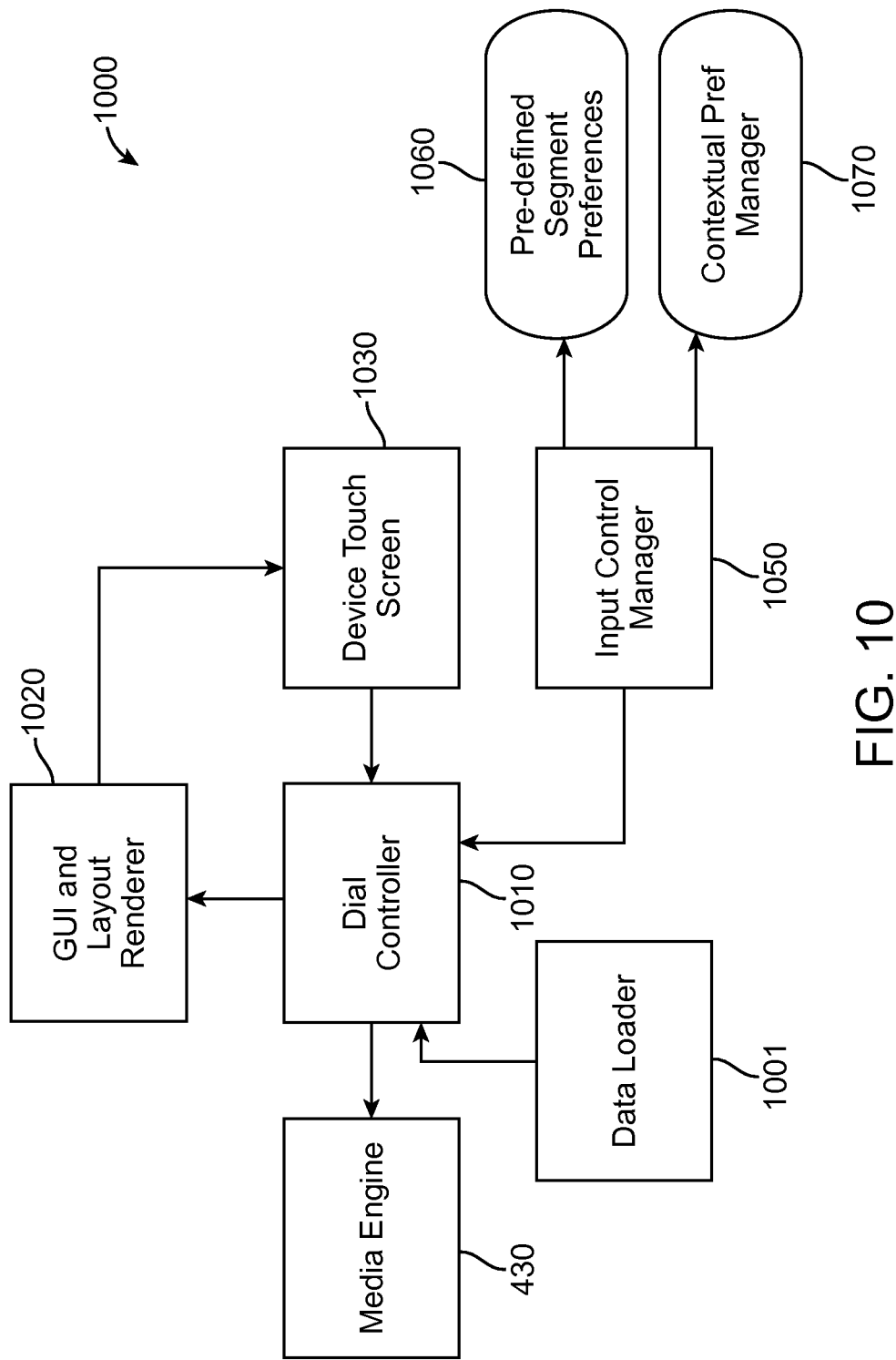
FIG. 10 shows an example block diagram for an architecture for content playback with a UI dial for playback selection, according to one embodiment.

FIG. 10 shows an example block diagram for an architecture 1000 for content playback with a UI dial (e.g., 851, FIG. 8, 951, FIG. 9) for playback selection, according to one embodiment. In one embodiment, the architecture 1000 for content navigation system may be employed on a client 305 (FIG. 3A). In one embodiment, the client 305 generates a content navigation UI (e.g., 850, FIG. 8, 900, FIG. 9) as a graphical user interface (GUI) on a touch screen display of the client 305 (e.g., electronic device 120, FIG. 2).

In one embodiment, a data loader module 1001 loads station data stored on the client 305 and passes the data to a dial controller module 1010. In one embodiment, the station data includes station metadata, music album cover art information, and audio track information for the current song of the station. In one embodiment, a GUI and layout renderer module 1020 renders a GUI (e.g., FIGS. 8-9), as specified by the output of the dial controller 1010. In one embodiment, a device touch screen 1030 displays the GUI rendered by the GUI and layout renderer module 1020.

In one embodiment, the device touch screen 1030 also receives input from the user and translates user actions (e.g., touches, swipes, etc.) to click events and movement events. In one embodiment, the dial controller 1010 serves multiple functions. In one embodiment, the dial controller 1010 receives user events from the device touch screen 1030, and determines the user intention (e.g., a tap to do a quick jump to a specific genre or a swipe for rotation of the dial to quickly change station-to-station). In one embodiment, the dial controller 1010 responds to user requests and updates what is displayed and played on the client 305. In one embodiment, the dial controller 1010 takes user input to determine/calculate the new station and determine what UI information to pass to the GUI and layout renderer module 1020. In one embodiment, the dial controller 1010 drives the music platform media engine 430 (see also, FIG. 4) to play station content on the client 305.

In one embodiment, the input control manager module 1050 implements feeds the speed and sensitivity preferences to the dial controller module 1010. In one embodiment, the pre-defined segment preferences 1060 are loaded at the initial launch of a content playback application or station player application. In one embodiment, the input segment preferences are fine-tuned by the contextual preference manager module 1070 as more usage statistics are collected by the contextual preference manager module 1070.

According to one embodiment, the content navigation system 1000 displays a GUI comprising a navigation wheel/dialer divided into multiple sectors 852 (e.g., FIGS. 8-9), providing a user information for which genre or station is located within the dial. In one example embodiment, if the user selects a sector at, for example, "2 o'clock" on the dial or "10 o'clock" on the dial, then the user knows where genres are situated because they may always be at the same position on the dial. In one embodiment, customization may be provided by the system where the user specifies where on the dial a genre may show up and the user may also choose a number (e.g., the maximum or minimum) of genres to be displayed on the dial. Further customization of the UI dial may include naming, position, location on the UI dial, etc.

In one embodiment, the navigation dial may comprise a circle, and the circle may be divided into as many genre stations that may be prefetched at the back end. In one embodiment, one revolution of the dial represents the total number of genres that are supported.

According to one embodiment, a set number of genre stations are provided for each revolution of the dial. In one example embodiment, if the user desires to navigate to the 30th station and each revolution represents 10 stations, then a user needs to rotate the dial three times by circularly swiping his finger on the wheel on the touch screen (e.g., dashed arrow A in FIG. 8), where three times represents three full revolutions. In one embodiment, the swiping action is analogous to grabbing/holding a circular physical radio knob and turning/spinning it. In one embodiment, the dial may emulate a car radio tuning knob where the radio has a dial from, for example, channel 88 to 110 MHz. In one example, if 103 MHz is an easy listening station, then the user needs to turn the tuning knob till the dial indicates 103 MHz. One embodiment provides presets on the wheel/dial. In one example embodiment, if the user taps on the genre name, the playback will jump to the first station in that genre.

One or more embodiments are useful with other audio formats (e.g., audio books). In other embodiments, the dial may be used to change channels or for content navigation. In one example embodiment, the dial may be applied to navigating other media, such as photos and videos. One or more embodiments are not limited to online radio stations, and are useful for navigation of other media (e.g., photos, video, text, emails, etc.).

Figure 11:
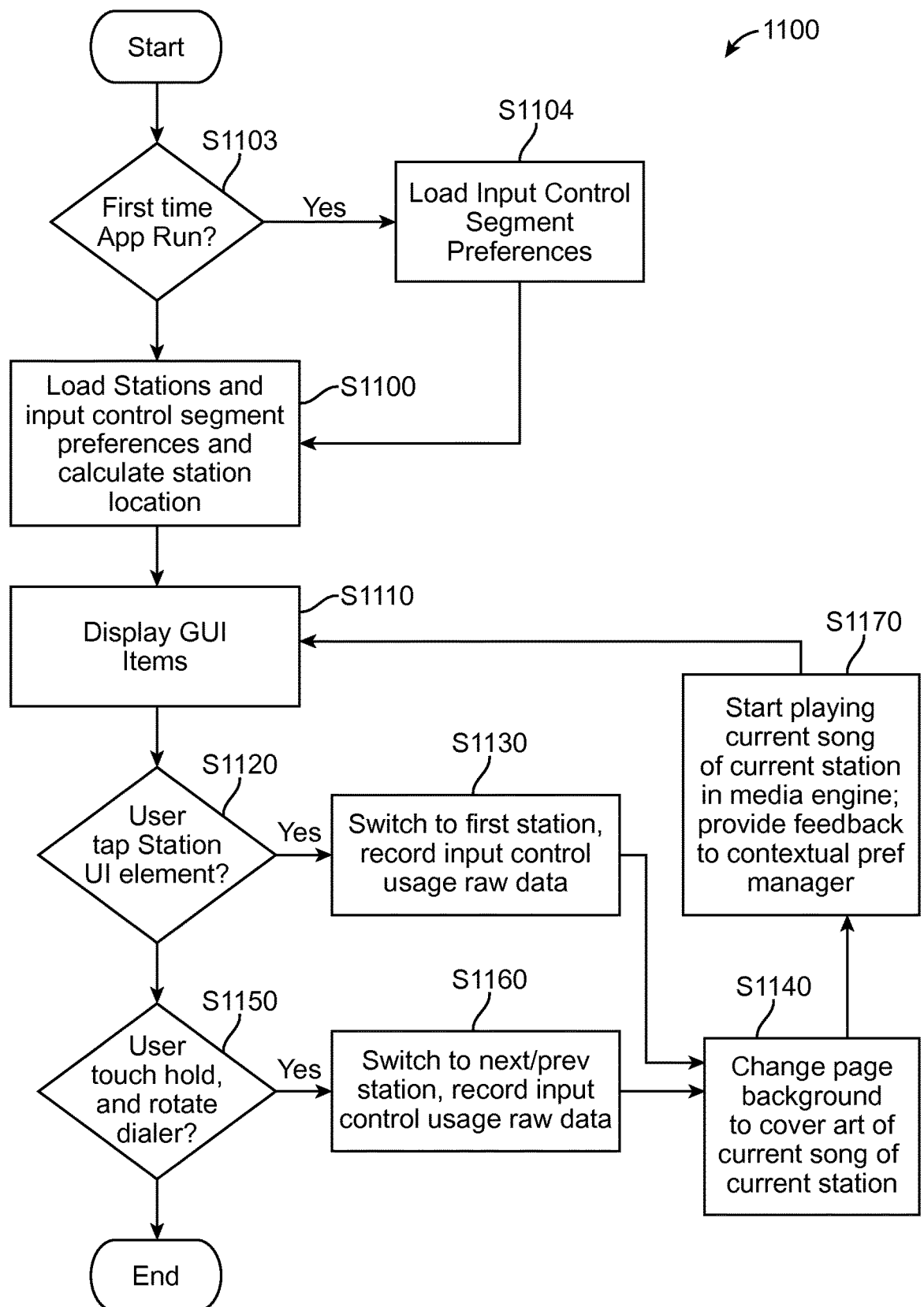
FIG. 11 shows an example flow diagram for content playback with a UI dial for playback selection, according to one embodiment.

FIG. 11 shows an example flow diagram for a content playback with a UI dial for playback selection process 1100, according to one embodiment. In one embodiment, the flow diagram 1100 includes the operation logic(s) of the sectors and the dial. In one embodiment, in block S1103, the data loader module 1001 (FIG. 10) checks if a navigation application has executed before (e.g., on the client 305, FIG. 3A). In one embodiment, if it is determined that the navigation application is starting for the first time, then in block S1104 the input control manager module 1050 handles gesture input control segment preferences.

In one embodiment, in block S1100, the data loader module 1001 loads station data from persistent storage of the client 305 and the dial controller module 1010 calculates/determines the dial sectors, genre locations, and station locations and the input control manager module 1050 calculates/determines the dialer speed and associated preference settings. In one embodiment, in S1110, the GUI and layout renderer module 1020 uses that data and renders the GUI items on the device touch screen 1030.

In one embodiment, the remainder of the process 1100 may be broken into multiple sections: (1) determining the user's intentions based on user interaction with the dial on the touch screen of the client 305, (2) responding to user requests and updating the client 305 display and audio, and (3) recording gesture usage statistics in raw data format. In one embodiment, blocks S1120 and S1150 implement determining the user intention to quick jump to a particular genre or quickly sample/preview adjacent stations. In one embodiment, blocks S1130, S1140, S1160, and S1170 implement switching to the intended station (i.e., updating the display, recording input control segment related preferences in raw data format and playing the correct song).

In one embodiment, in block S1120 the dial controller module 1010 checks if user input from the device touch screen 1030 indicates the user tapped a genre UI element or sector. In one embodiment, if the user did tap a genre UI element or sector, in block S1130 the dial controller 1010 switches the current station to the first station in the selected genre. In one embodiment, at this point, the process 1100 continues to a switch station process or function. In one embodiment, in block S1150, the dial controller module 1010 checks if user input from the device touch screen 1030 indicates that the user has rotated the dial UI. In one embodiment, if a rotate event is detected, then in block S1160 the dial controller module 1010 switches to the next or previous station depending on the direction of the rotate event (e.g., clockwise or counter-clockwise). In one embodiment, in the switch station process, in block S1140 the dial controller module 1010 directs the GUI and layout renderer module 1020 to change the screen background to the cover art of the current song of the current station. In one embodiment, in block S1170, the dial controller module 1010 directs the music platform and media engine module 430 to start playing the current song of the current station.

One or more embodiments provide accelerated audio playback start-up and the display of related meta-data on an electronic device (e.g., electronic device 120, FIG. 2) or client device (e.g., client 305, FIG. 3A) utilizing a navigation dial, such that when the user changes the content source (e.g., radio stations) by using a dial UI (e.g., 851, FIG. 8, 951, FIG. 9), the electronic device or client starts playing without reduced buffering time (i.e., without delay from buffering). One or more embodiments provide support for a UI that allows the user to change through a number of content sources quickly (i.e., rotating a dial through different stations). In one embodiment, the UI displayed on a touch screen of an electronic device or client comprises a graphic radio dial control that the user can quickly rotate and hear a number of sub-second station sound clips (e.g., previews).

FIG. 12 shows an example illustration 1200 of finger movement 1205 for interacting with a UI dial (e.g., 851, FIG. 8, 951, FIG. 9), according to one embodiment. In one embodiment, finger gesture based navigation control methods may be implemented in a number of ways. In one embodiment, finger gesture 1205 based navigation comprises of a "Start" and a "Finish" (e.g., along the arrow 1206) of input control through a single continuous finger gesture as illustrated. In one embodiment, "Start" and "Finish" of input control are detected by "Touching the screen" or "Pausing the finger motion".

In one embodiment, one continuous finger gesture motion through pre-defined or dynamically generated pattern based input control segments 1210 (for controlling sensitivity or speed of input control) are implemented for the dial UI. In one embodiment, the dial UI uses a pre-defined pattern of controlling input control segments. In one example embodiment, user finger movement 1205 gestures control a set number of station changes per revolution of the dial or circle. In one embodiment, the distance between input control segments is equal throughout the gesture segment 1210, which may also be comprised of various different segment sizes. In one embodiment, the number of station changes per revolution may be adjustable (e.g., user selectable, based on number of genre or stations, etc.).

FIG. 13 shows an example illustration 1300 of finger movement interaction and a UI dial (e.g., 851, FIG. 8, 951, FIG. 9) result for a first segment type, according to one embodiment. In one embodiment, in Segment Type 1, the finger gesture segment may indicate, for example, seven station changes for the distance traveled. In one example embodiment, the user sees the UI indicator pass seven stations on the display of their device (e.g., client 305, FIG. 3A). In one embodiment, the user finger gesture starts at 1301 and finishes at 1302. In one embodiment, the control unit call for an action 1305 includes the equal distance segments 1303 for Segment Type 1.

FIG. 14 shows an example illustration 1400 of finger movement interaction and a UI dial (e.g., 851, FIG. 8, 951, FIG. 9) result for a second segment type, according to one embodiment. In one example embodiment, a dynamic layout for station changes is provided, which may increase the number of stations changed based on continuous movement and distance of the finger gesture segment, regardless of speed or rate. In one embodiment, as movement begins at the start 1401, a longer distance of the finger gesture segment is needed to change stations. In one example embodiment, as movement continues and the distance moved becomes longer, less movement is needed to change stations, providing an acceleration effect independent of speed to the finish 1402. In one embodiment, as soon as movement pauses or contact is lost with the screen, the dynamic layout restarts. In one example embodiment, the Segment Type 2 allows for fine and coarse station manipulation based on figure gesture. In one example embodiment, the dynamic layout is implemented by having the distance between station changes start out larger (e.g., segments 1404) and reduces in size based on continuous movement and distance of the finger gesture segment (e.g., segments 1403).

In one example embodiment, in the Segment Type 2, the entire length of the finger gesture segment may be, for example, 3 inches. In one example embodiment, the first inch of movement may only change two stations, as the movement continues the second inch of movement may result in five more station changes. The third inch of movement may result in 10 more station changes. In one embodiment, the finger gesture provides for changing from fine to coarse manipulation. In one example embodiment, the UI dial indicator may provide for passing through, for example, 17 stations. In one embodiment, the user finger gesture starts at 1401 and finishes at 1402. In one embodiment, the control unit call for an action 1405 includes the non-equal distance segments 1404 to 1403 for Segment Type 2.

FIG. 15 shows an example illustration 1500 of display marker movement 1501 for a UI dial (e.g., 851, FIG. 8, 951, FIG. 9), according to one embodiment. In one embodiment, for the different examples using a pre-defined pattern, the patterns may be dynamically generated by the system based on a usage pattern of each user (e.g., the system may auto-adjust the sensitivity of the UI dial by dynamically constructing the input control segments. In one embodiment, Segment Type 1 1503 and Segment Type 2 1504 may be combined where the different dashed lines 1502 indicate distance traveled by a finger gesture that rotates the UI dial. In one or more embodiment, the multiple sectors of the UI dial are one of spaced apart at a fixed distance from one another and are variable spaced apart based on a particular finger gesture on the touch screen (e.g., length of finger gesture, speed of finger gesture, etc.).

FIG. 16 shows an example illustration of a UI 1600 of a UI dial 1602, according to one embodiment. In one embodiment, the UI dial 1602 includes a circular dial with various genre/station selections around the UI dial 1602, where a user may gesture with their finger to rotate/spin the dial for station selection. In one embodiment, the UI dial 1602 includes a station or genre selection indicator 1601 or reference point that may rotate around the different genre or stations as a radio dial for station selection.

In one embodiment, the navigation for station selection may be a compound mechanic which changes based on where the figure gesture is recognized. For example, finger gestures within the circular dial may result in navigation mechanics described above in FIGS. 13-15, while finger gestures outside the circular dial may result in the station or genre selection indicator 1601 directly tracking the finger gesture or be pointed in the direction the finger gesture is recognized. Optionally, the boundary where the navigation mechanic changes may be within the indicator ring, within the station or genre ring, or any predetermined area that may be transparent to a user.

FIGS. 17-19 show example illustrations of a UI 1600 with station management and customization selections, according to one embodiment. In one embodiment, FIG. 17 shows an example screen shot 1700 including management of stations that is provided on a UI 1710 for various station functions, such as selecting a favorite song(s) based on currently playing station, banning songs from one or more stations, adding a new station, creating a station based on currently playing song, and view station details (e.g., genre, type of music/songs, artists, information on bands, artists, etc.).

FIG. 18 illustrates an example screen shot 1800, according to one embodiment. In one embodiment, the UI 1810 includes user selections for: create station, manage my stations, customize the UI dial 1602 (FIG. 16), select favorite songs, view history (e.g., songs played, stations played, content displayed, etc.), view or change settings, lookup topics for help, etc.

FIG. 19 illustrates an example screen shot 1900, according to one embodiment. In one embodiment, the UI 1910 provides for fine tuning of stations (e.g., based on type of songs, release date, pace of song (e.g., fast, slow, etc.), artists (more or less music/songs based on particular artists), popularity (e.g., trending, based on social media, number of plays, etc.), personal favorites, etc.

In one embodiment, a UIs of FIGS. 17-19 for customization and management may include drop-down menus, slide bars, line item selections, dial interfaces, etc. for selection and control of the songs, music, genre, display, settings, etc. In one or more embodiments, the settings and management may be shared or selected from others. For example, users may select settings from a friend or published settings or selections as desired. In one embodiment, the imported settings or selections may be downloaded, transferred via Bluetooth (or other means), sent via text message, email, etc.

Figure 20:
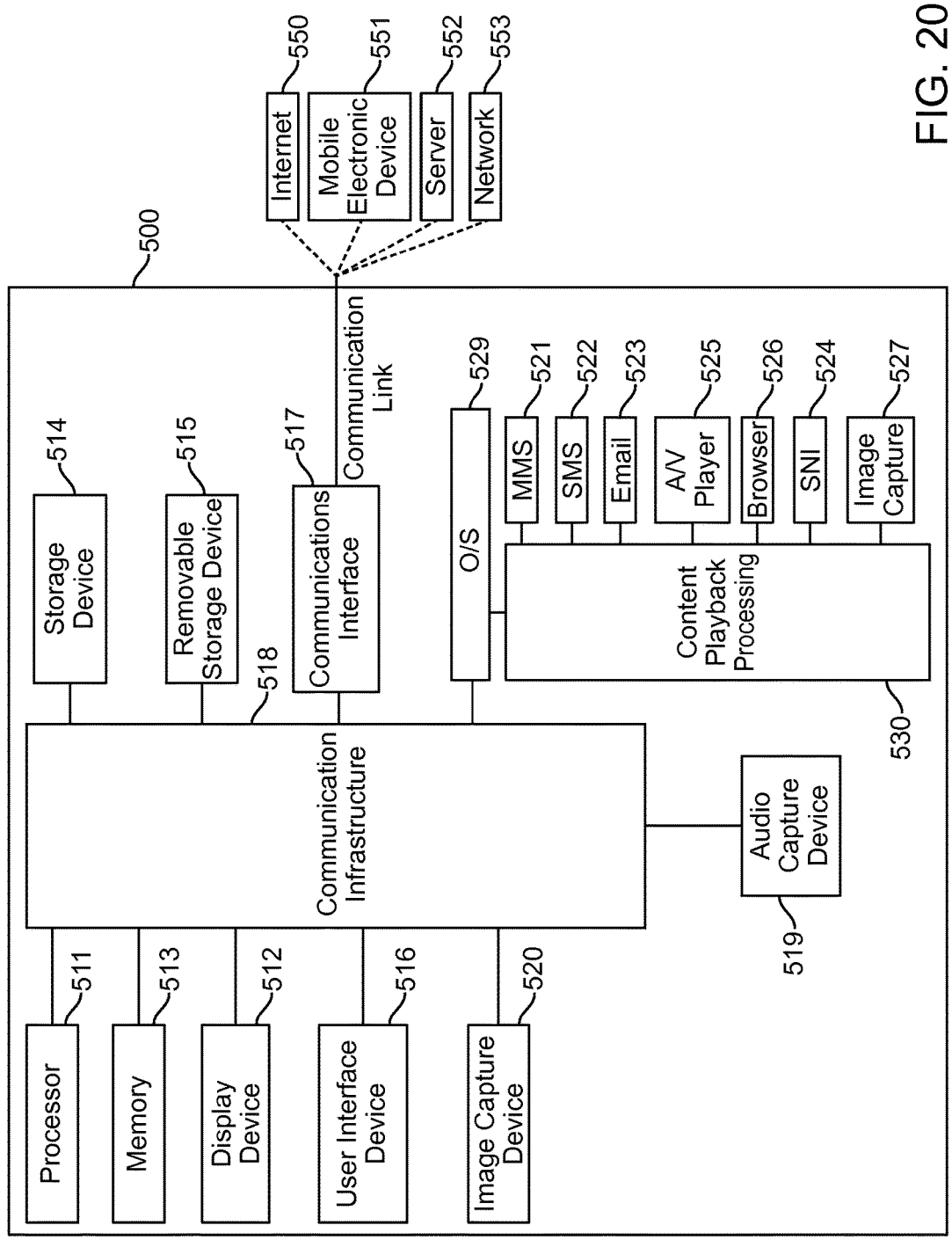
FIG. 20 is a high-level block diagram showing an information processing system comprising a computing system implementing one or more embodiments.

FIG. 20 is a high-level block diagram showing an information processing system comprising a computing system 500 implementing one or more embodiments. The system 500 includes one or more processors 511 (e.g., ASIC, CPU, etc.), and may further include an electronic display device 512 (for displaying graphics, text, and other data), a main memory 513 (e.g., random access memory (RAM), cache devices, etc.), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as Wi-Fi, Cellular), a network interface (such as an Ethernet card), a communications port, or a PCMCIA slot and card).

The communication interface 517 allows software and data to be transferred between the computer system and external devices through the Internet 550, mobile electronic device 551, a server 552, a network 553, etc. The system 500 further includes a communications infrastructure 518 (e.g., a communications bus, cross bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, tablet, wearable device, etc.), the system 500 further includes an image capture device 520, such as a camera 128 (FIG. 2), and an audio capture device 519, such as a microphone 122 (FIG. 2). The system 500 may further include application modules as MMS module 521, SMS module 522, email module 523, social network interface (SNI) module 524, audio/video (AV) player 525, web browser 526, image capture module 527, etc.

In one embodiment, the system 500 includes a content playback processing module 530 that may implement processing similar as described regarding client 305 (FIG. 3A), and client 305 components in block diagram 400. In one embodiment, the content playback processing module 530 may implement the process of flowchart 800 (FIG. 7). In one embodiment, the content playback processing module 530 along with an operating system 529 may be implemented as executable code residing in a memory of the system 500. In another embodiment, the content playback processing module 530 may be provided in hardware, firmware, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for content playback comprising:
   maintaining a wireless connection between an electronic device and a content source;
   prefetching, by the electronic device, content prior to attempting to play at least one station on the electronic device;
   distinguishing between scanning a plurality of stations and playing a particular one station; and
   playing a preview content clip from memory of the electronic device until a particular mode time threshold is reached.

2. The method of claim 1, wherein:
   maintaining the connection comprises an open command channel with the content source; and
   prefetching content comprises prefetching preview content clips, cover art, and metadata for all on-deck content for the plurality of stations.

3. The method of claim 2, wherein the open command channel comprises an Open WebSocket command channel, and the content source comprises a server.

4. The method of claim 3, further comprising:
   receiving a heartbeat periodically for reducing antenna wakeup time and associated latency; and
   loading the preview content clip from a file system into a buffer in the memory of the electronic device.

5. The method of claim 4, further comprising:
   maintaining playback in a scan mode prior to reaching the particular mode time threshold; and
   requesting additional content data upon a determination that content in the buffer is below a first particular storage size threshold after the particular mode time threshold is reached.

6. The method of claim 5, further comprising:
   triggering a request for a preview content clip of next content available for playback of a current selected station upon a determination that the content in the buffer is above the first particular storage size threshold; and
   displaying stations on a rotatable user interface dial on the electronic device for selection of a particular station for playing of content.

7. The method of claim 6, wherein upon playback reaching a particular point and remaining content in the buffer is below a second particular storage size threshold for content being played on the current selected station, then requesting additional content data.

8. The method of claim 1, wherein the content comprises at least one of audio data, video data, and audio and video data, and requests to the server comprise asynchronous requests.

9. The method of claim 2, wherein the command channel comprises a separate transport layer and supports at least two different transports.

10. The method of claim 1, wherein the maintained connection is based on a standard HTTP connection with keep alive enabled.

11. The method of claim 1, wherein:
    the connection between the electronic device and the content source is a WebSocket connection; and
    an HTTP request in an HTTP local pool times out after a particular time interval and is dynamically deleted.

12. A client for content playback comprising:
    a command channel interface configured to provide an interface to a content server and to maintain a wireless connection between the client including wireless hardware and the content server;
    a prefetch manager configured to prefetch content to a memory used by the client prior to a radio service attempting to play at least one station by the client; and
    the radio service is configured to:
       provide for distinguishing between playback of scanning a plurality of stations for preview content clips and playing content for a particular one station, and
       play a preview content clip from the memory used by the client until a station manager determines that a particular mode time threshold is reached.

13. The client of claim 12, wherein:
    the connection comprises an open command channel with the content server;
    prefetched content comprises preview content clips, cover art, and metadata for all next to play content for the plurality of stations; and
    the open command channel comprises an Open WebSocket command channel.

14. The client of claim 13, wherein:
    the client receives a heartbeat signal periodically for reducing client antenna wakeup time and associated latency; and
    the prefetch manager loads the preview content clip from a file system into a buffer in the memory used by the client.

15. The client of claim 14, wherein:
    the radio service maintains playback in a scan mode prior to reaching the particular mode time threshold; and
    after the particular mode time threshold is reached, the prefetch manager checks whether content in the buffer is below a first particular storage size threshold, and upon aq determination that the content in the buffer is below the first particular storage size threshold, the prefetch manager requests additional content data.

16. The client of claim 15, wherein the prefetch manager determines whether the content in the buffer is above the first particular storage size threshold, and upon a determination that the content in the buffer is above the first particular storage size threshold then the prefetch manager requests a preview content clip of next content that is available for playback by the radio service of a currently selected station.

17. The client of claim 16, wherein upon playback reaching a particular point and remaining content in the buffer is below a second particular storage size threshold for content being played on the current selected station, then the prefetch manager requests additional content data.

18. The client of claim 12, wherein the content comprises at least one of audio data, video data, and audio and video data, and the client displays at least one station on a moveable user interface dial on an electronic device for selection of a particular station for playing of content.

19. The client of claim 15, wherein requests to the server comprise asynchronous requests, the command channel comprises a separate transport layer and supports at least two different transports, and the maintained connection is based on a standard http connection with keep alive enabled.

20. The client of claim 12, wherein:
the command channel interface further:
uses a proxy to establish the connection between the client and the content server via a WebSocket connection;
serves all HTTP requests by the proxy after the connection is established;
parses a HTTP request received using the proxy, maintains the HTTP request in an HTTP local pool, and sends another HTTP request to the content server through the WebSocket connection; and
fetches an initial HTTP response and pipes a response received from the content server using the proxy;
HTTP requests in the HTTP local pool times out after a particular time interval and are dynamically deleted; and
upon the Web Socket connection being interrupted or lost, the proxy attempts to reestablish the WebSocket connection.

21. A non-transitory computer-readable medium embodied thereon instructions being executable by at least one processor to perform a method comprising:
maintaining a wireless connection between an electronic device and a content source;
prefetching, by the electronic device, content prior to attempting to play at least one station on the electronic device;
distinguishing between scanning a plurality of stations and playing a particular one station; and
playing a preview content clip from memory of the electronic device until a particular mode time threshold is reached.

22. The non-transitory computer-readable medium of claim 21, wherein:
the maintained connection comprises an open command channel with the content source;
prefetching content comprises prefetching preview content clips, cover art, and metadata for all on-deck content for the plurality of stations; and
the open command channel comprises an Open WebSocket command channel, and the content source comprises a server.

23. The non-transitory computer-readable medium of claim 22, further comprising:
receiving a heartbeat periodically by the electronic device for reducing antenna wakeup time and associated latency; and
loading the preview content clip from a file system into a buffer in the memory of the electronic device.

24. The non-transitory computer-readable medium of claim 23, further comprising:
maintaining playback in a scan mode prior to reaching the particular listening mode time threshold; and
requesting additional content data upon a determination that content in the buffer is below a first particular storage size threshold after the particular listening mode time threshold is reached.

25. The non-transitory computer-readable medium of claim 24, further comprising:
triggering a request for a preview content clip of next content available for playback of a current selected station upon a determination that the content in the buffer is above the first particular storage size threshold; and
requesting additional content data upon playback reaching a particular point and remaining content in the buffer is below a second particular storage size threshold for content being played on the current selected station.

26. The non-transitory computer-readable medium of claim 21, wherein:
the content comprises at least one of audio data, video data, and audio and video data;
requests to the server comprise asynchronous requests;
the command channel comprises a separate transport layer and supports at least two different transports; and
the maintained connection is based on a standard http connection with keep alive enabled.

27. The non-transitory computer-readable medium of claim 21, further comprising:
establishing, by a proxy, the connection between the electronic device and the content source via a WebSocket connection;
serving all HTTP requests by the proxy after the connection is established;
upon receiving an HTTP request from the electronic device, parsing, by the proxy, the HTTP request, maintaining the HTTP request in an HTTP local pool, and sending another HTTP request to the content source through the Web Socket connection; and
upon receiving a response from the content source, fetching, by the proxy, an initial HTTP response and piping the response,
wherein HTTP requests in the HTTP local pool times out after a particular time interval and are dynamically deleted, and
upon the WebSocket connection being interrupted or lost, the proxy attempts to reestablish the Web Socket connection.

* * * * *